(12) United States Patent
Kozin

(10) Patent No.: US 12,542,785 B2
(45) Date of Patent: Feb. 3, 2026

(54) LOCATION BASED ACCESS CONTROL

(71) Applicant: Juniper Networks, Inc., Sunnyvale, CA (US)

(72) Inventor: Vladimir Vladimirovich Kozin, Livermore, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 118 days.

(21) Appl. No.: 18/477,103

(22) Filed: Sep. 28, 2023

(65) Prior Publication Data

US 2025/0112930 A1    Apr. 3, 2025

(51) Int. Cl.
H04L 9/40    (2022.01)

(52) U.S. Cl.
CPC ........ H04L 63/107 (2013.01); H04L 63/0428 (2013.01)

(58) Field of Classification Search
CPC ..... H04W 12/64; H04W 12/63; H04W 12/08; H04W 4/023; H04L 63/107; H04L 63/0428
USPC ........................................................... 726/1
See application file for complete search history.

(56) References Cited

U.S. PATENT DOCUMENTS

| | | | |
|---|---|---|---|
| 9,642,167 B1 | 5/2017 | Snyder et al. |
| 9,674,684 B1 | 6/2017 | Mendelson |
| 9,729,439 B2 | 8/2017 | MeLampy et al. |
| 9,729,682 B2 | 8/2017 | Kumar et al. |
| 9,762,485 B2 | 9/2017 | Kaplan et al. |
| 9,832,082 B2 | 11/2017 | Dade et al. |
| 9,871,748 B2 | 1/2018 | Gosselin et al. |
| 9,898,881 B2 | 2/2018 | Ives-Halperin et al. |
| 9,912,662 B2 | 3/2018 | Edge et al. |
| 9,930,670 B2 | 3/2018 | Yi et al. |
| 9,979,559 B2 | 5/2018 | Wang et al. |

(Continued)

FOREIGN PATENT DOCUMENTS

| | | |
|---|---|---|
| EP | 2665237 A1 | 11/2013 |
| WO | 2018170061 A1 | 9/2018 |

OTHER PUBLICATIONS

Amaldev, "UWB: The Tech Behind Apple AirTags", The Tech Blog, Apr. 25, 2021, 8 pp., URL: http://amaldev.blog/uwb-the-tech-behind-apple-airtags/.

(Continued)

Primary Examiner — Amare F Tabor
(74) Attorney, Agent, or Firm — Shumaker & Sieffert, P.A.

(57) ABSTRACT

The techniques describe a network management system (NMS) configured to obtain, from a first computing device supporting ultra-wide band (UWB) protocol, a request to access a resource. The NMS may initiate an UWB secure ranging session between the first computing device and a second computing device to determine a location of the first computing device, the second computing device supporting the UWB protocol. The NMS may obtain, based on the UWB secure ranging session, distance measurements between the first computing device and the second computing device. The NMS may determine the location of the first computing device based on the distance measurements. The NMS may provide the first computing device with access to the resource based on the location of the first computing device satisfying a condition of an access policy for the resource.

20 Claims, 10 Drawing Sheets

(56) References Cited

U.S. PATENT DOCUMENTS

| | | | |
|---|---|---|---|
| 9,985,883 | B2 | 5/2018 | MeLampy et al. |
| 9,986,578 | B2 | 5/2018 | Gunasekara |
| 10,200,264 | B2 | 2/2019 | Menon et al. |
| 10,277,506 | B2 | 4/2019 | Timmons et al. |
| 10,348,561 | B1 * | 7/2019 | Caine ................. H04L 67/52 |
| 10,432,522 | B2 | 10/2019 | Kaplan et al. |
| 10,432,691 | B2 * | 10/2019 | Svevar ................. H04L 7/0091 |
| 10,602,329 | B2 | 3/2020 | Addepalli et al. |
| 10,756,983 | B2 | 8/2020 | Ratkovic et al. |
| 10,862,742 | B2 | 12/2020 | Singh |
| 10,958,537 | B2 | 3/2021 | Safavi |
| 10,958,585 | B2 | 3/2021 | Safavi |
| 10,972,911 | B2 | 4/2021 | Lerch et al. |
| 10,985,969 | B2 | 4/2021 | Safavi |
| 10,992,543 | B1 | 4/2021 | Rachamadugu et al. |
| 11,017,376 | B1 * | 5/2021 | Dietrich ................. H04W 4/023 |
| 11,075,824 | B2 | 7/2021 | McCulley et al. |
| 11,226,392 | B1 | 1/2022 | Castagnoli et al. |
| 11,544,978 | B2 | 1/2023 | Kusens et al. |
| 11,778,418 | B2 | 10/2023 | Castagnoli et al. |
| 11,936,771 | B2 * | 3/2024 | Yoon ................. G01S 13/0209 |
| 12,114,226 | B2 * | 10/2024 | Glover ................. H04W 4/46 |
| 12,287,394 | B2 * | 4/2025 | Schober ................. H04L 43/106 |
| 2019/0236869 | A1 | 8/2019 | Kazerani et al. |
| 2020/0162853 | A1 | 5/2020 | Gunasekara et al. |
| 2021/0099863 | A1 * | 4/2021 | Naguib ................. H04W 12/63 |
| 2021/0306201 | A1 | 9/2021 | Wang et al. |
| 2022/0066010 | A1 | 3/2022 | Henry et al. |
| 2022/0191647 | A1 | 6/2022 | Zohoorian et al. |
| 2023/0126313 | A1 | 4/2023 | Shah et al. |

OTHER PUBLICATIONS

Apple, "Initiating and maintaining a session", Apple Developer Documentation, 7 pp., Retrieved from the Internet on Dec. 28, 2023 from URL: https://developer.apple.com/documentation/nearbyinteraction/initiating_and_maintaining_a_session.

Apple, "What's new in Nearby Interaction", 2 pp., Retrieved from the Internet on Dec. 28, 2023 from URL: https://developer.apple.com/videos/play/wwdc2022/10008/.

Guy, "The Best Bluetooth Trackers for Finding Your Stuff", BuySide WSJ, Dow Jones & Company, Inc., Nov. 16, 2023, 6 pp., URL: https://www.wsj.com/buyside/electronics/best-bluetooth-tracker-01658429355.

Hsu, "IEEE 802.15.4 HRP UWB Ranging Process and Measurements", Keysight, Jul. 28, 2021, 11 pp., URL: https://www.keysight.com/blogs/en/tech/rfmw/2021/07/25/IEEE-802154-hrp-uwb-ranging-process-and-measurements.

IEEE, "IEEE Standard for Low-Rate Wireless Networks", IEEE Computer Society, Apr. 22, 2011, 708 pp.

Savill, "Functionality of Conditional Access, MFA and SSO—AZ-900 Certification Course", YouTube, Jan. 2, 2022, 3 pp., URL: https://www.youtube.com/watch?v=DFwERh9Xxk0.

Shi et al., "High Rate Pulse Ultrawideband Physical Layer Testing and Certification", Rohde&Schwarz: White paper, vol. 1, Feb. 10, 2022, 48 pp.

Soganci et al., "Accurate Positioning in Ultra-wideband Systems", IEEE Wireless Communications, vol. 18, No. 2, Apr. 15, 2011, pp. 19-27.

Yang et al., "Board Images", Tech Insights, Oct. 1, 2019, 12 pp., URL: https://www.techinsights.com/blog/apple-iphone-11-pro-max-teardown.

Inpixon Indoor Intelligence, "Ultra-Wideband RTLS, Positioning, & Sensor Technology", Inpixon, 13 pp., Retrieved from the Internet on Jan. 18, 2024 from URL: https://www.inpixon.com/technology/standards/ultra-wideband.

Simons, "New Microsoft Authenticator security features are now available!", Microsoft, Nov. 18, 2021, 5 pp., URL: https://techcommunity.microsoft.com/t5/microsoft-entra-blog/new-microsoft-authenticator-security-features-are-now-available/ba-p/2464386.

Extended Search Report from counterpart European Application No. 23218223.8 dated Apr. 15, 2024, 8 pp.

Response to Extended Search Report dated Apr. 15, 2024, from counterpart European Application No. 23218223.8 filed Oct. 1, 2025, 18 pp.

* cited by examiner

LOCATION BASED ACCESS CONTROL

TECHNICAL FIELD

The disclosure relates generally to computer networks and, more specifically, to monitoring and troubleshooting computer networks.

BACKGROUND

Commercial premises or sites, such as offices, hospitals, airports, stadiums, or retail outlets, often install complex wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network. In the case of a client device running a cloud-based application, such as voice over Internet Protocol (VOIP) applications, streaming video applications, gaming applications, or video conference applications, data is exchanged during an application session from the client device through one or more APs and one or more wired network devices, e.g., switches, routers, and/or gateway devices, to reach the cloud-based application server.

SUMMARY

In general, this disclosure describes one or more techniques for providing a computing device access to restricted resources provided at an enterprise network site based on a physical location of the computing device. A network management system may regulate access to the restricted resources to computing devices with ultrawide-band (UWB) technology. The network management system may determine the physical location of a computing device requesting access to a resource using UWB secure ranging. For example, the network management system may assign an authorized device (e.g., an access point, a switch, a server, a client device, etc.) as a UWB 'beacon.' The network management system may use the UWB beacon as a reference point for a physical location in which access to resources may be granted. The network management system may use a determined physical location of the requesting computing device as a factor in whether to provide the requesting computing device with access to the restricted resource.

The techniques of this disclosure may provide one or more advantages. For example, the techniques include a network management system regulating access to resources based on a physical location of a requesting computing device. The network management system may use UWB technology to determine a location of a requesting computing device with relatively high accuracy (e.g., within one meter of the requesting computing device's actual location). The network management system may use UWB technology to prevent a requesting computing device from 'spoofing' or broadcasting a false location. In this way, the network management system may securely use location of a requesting computing device as a reliable factor when determining whether to grant the requesting computing device access to computer network resources.

In one example, the disclosure is directed to a network management system that may include processing circuitry and memory comprising instructions. The instructions, when executed by the processing circuitry, cause the processing circuitry to obtain, from a first computing device on a wireless network at a site, a request to access a resource, the first computing device supporting ultra-wide band (UWB) protocol. The instructions may further cause the processing circuitry to initiate an UWB secure ranging session between the first computing device and a second computing device to determine a location of the first computing device, wherein the second computing device is on the wireless network at the site and supporting the UWB protocol. The instructions may further cause the processing circuitry to obtain, based on the UWB secure ranging session, one or more distance measurements between the first computing device and the second computing device. The instructions may further cause the processing circuitry to determine the location of the first computing device based on the one or more distance measurements. The instructions may further cause the processing circuitry to provide the first computing device with access to the resource based on the location of the first computing device satisfying a condition of an access policy for the resource.

In another example, a method includes obtaining, from a first computing device on a wireless network at a site, a request to access a resource, the first computing device supporting ultra-wide band (UWB) protocol. The method may further include initiating an UWB secure ranging session between the first computing device and a second computing device to determine a location of the first computing device, wherein the second computing device is on the wireless network at the site and supporting the UWB protocol. The method may further include obtaining, based on the UWB secure ranging session, one or more distance measurements between the first computing device and the second computing device. The method may further include determining the location of the first computing device based on the one or more distance measurements. The method may further include providing the first computing device with access to the resource based on the location of the first computing device satisfying a condition of an access policy for the resource.

In another example, a computer-readable storage media comprises machine readable instructions for configuring processing circuitry to obtain, from a first computing device on a wireless network at a site, a request to access a resource, the first computing device supporting ultra-wide band (UWB) protocol. The processing circuitry may further be configured to initiate an UWB secure ranging session between the first computing device and a second computing device to determine a location of the first computing device, wherein the second computing device is on the wireless network at the site and supporting the UWB protocol. The processing circuitry may further be configured to obtain, based on the UWB secure ranging session, one or more distance measurements between the first computing device and the second computing device. The processing circuitry may further be configured to determine the location of the first computing device based on the one or more distance measurements. The processing circuitry may further be configured to provide the first computing device with access to the resource based on the location of the first computing device satisfying a condition of an access policy for the resource.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
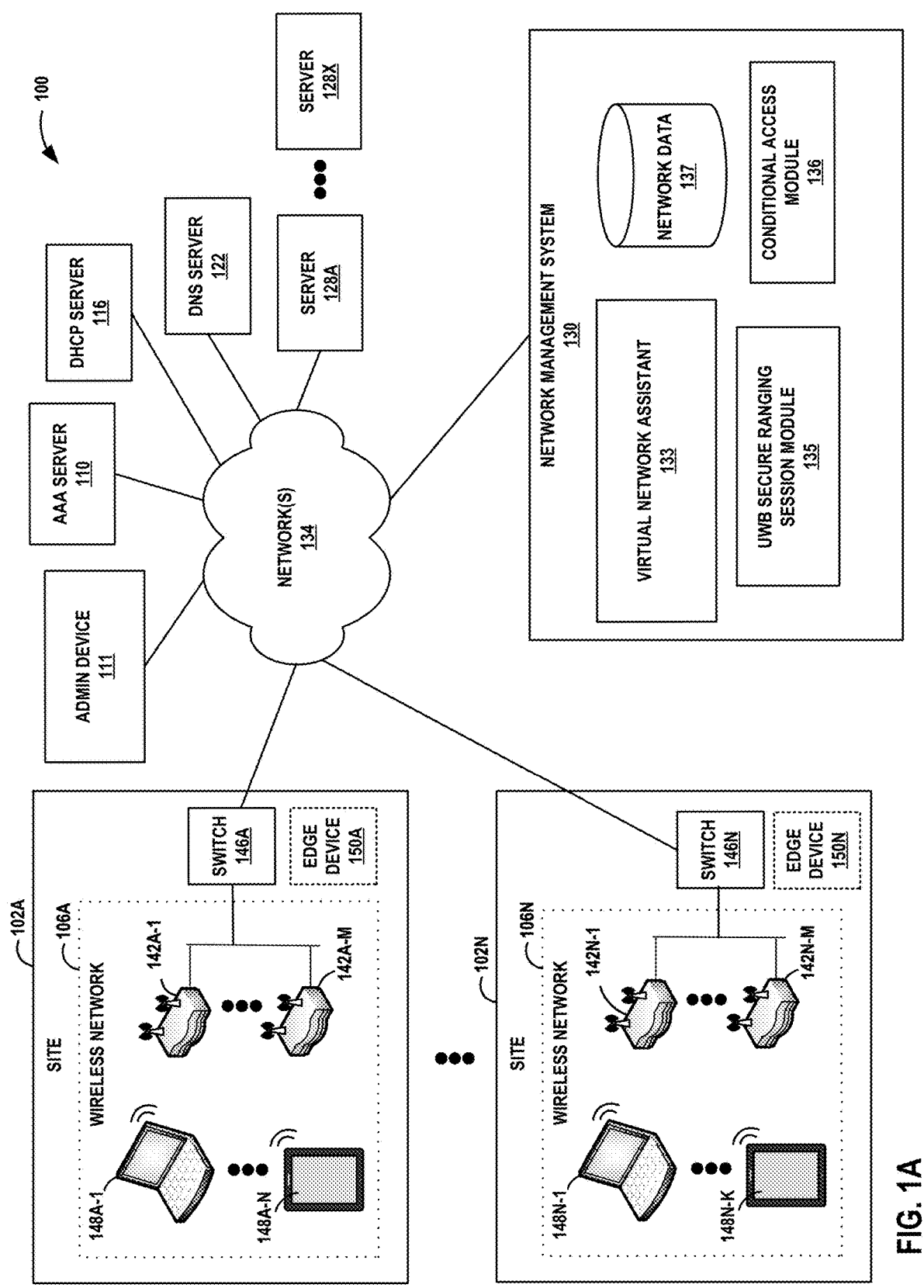
FIG. 1A is a block diagram of an example network system including a network management system, in accordance with one or more techniques of the disclosure.

FIG. 1A is a block diagram of an example network system 100 including network management system (NMS) 130, in accordance with one or more techniques of this disclosure. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Each site 102A-102N includes a plurality of network access server (NAS) devices, such as access points (APs) 142, switches 146, or routers (not shown). For example, site 102A includes a plurality of APs 142A-1 through 142A-M. Similarly, site 102N includes a plurality of APs 142N-1 through 142N-M. Each AP 142 may include at least one type of wireless access point, including, but not limited to, a commercial or enterprise AP, a router, or another device that is connected to a wired network and is capable of providing wireless network access to client devices within the site.

Each site 102A-102N also includes a plurality of client devices, otherwise known as user equipment devices (UEs), referred to generally as UEs or client devices 148, representing various wireless-enabled devices within each site. For example, a plurality of UEs 148A-1 through 148A-K are currently located at site 102A. Similarly, a plurality of UEs 148N-1 through 148N-K are currently located at site 102N. Each UE 148 may include at least one type of wireless client device, including, but not limited to, a mobile device such as a smart phone, tablet or laptop computer, a personal digital assistant (PDA), a wireless terminal, a smart watch, smart ring, or other wearable device. UEs 148 may also include wired client-side devices, e.g., IoT devices such as printers, security devices, environmental sensors, or another device connected to the wired network and configured to communicate over one or more wireless networks 106.

In order to provide wireless network services to UEs 148 and/or communicate over the wireless networks 106, APs 142 and the other wired client-side devices at sites 102 are connected, either directly or indirectly, to one or more network devices (e.g., switches, routers, or the like) via physical cables, e.g., Ethernet cables. In the example of FIG. 1A, site 102A includes a switch 146A to which each of APs 142A-1 through 142A-M at site 102A are connected. Similarly, site 102N includes a switch 146N to which each of APs 142N-1 through 142N-M at site 102N are connected. Although illustrated in FIG. 1A as if each site 102 includes a single switch 146 and APs 142 of the given site 102 are connected to the single switch 146, in other examples, each site 102 may include more or fewer switches and/or routers. In addition, the APs and the other wired client-side devices of the given site may be connected to two or more switches and/or routers. In addition, two or more switches at a site may be connected to each other and/or connected to two or more routers, e.g., via a mesh or partial mesh topology in a hub-and-spoke architecture. In some examples, interconnected switches and routers comprise wired local area networks (LANs) at sites 102 hosting wireless networks 106.

Example network system 100 also includes various networking components for providing networking services within the wired network including, as examples, an Authentication, Authorization and Accounting (AAA) server 110 (e.g., Identity Access Management (IAM) System, Identity Providers (IdP), Service Provider (SP), etc.) for authenticating users and/or UEs 148 (e.g., according to one or more business rules, access policies, etc.), a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128A-128X (collectively "servers 128") (e.g., web servers, databases servers, file servers and the like), and a network management system (NMS) 130. As shown in FIG. 1A, the various devices and systems of network 100 are coupled together via one or more network(s) 134, e.g., the Internet and/or an enterprise intranet.

In the example of FIG. 1A, NMS 130 is a cloud-based computing platform that manages wireless networks 106A-106N at one or more of sites 102A-102N. As further described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. In some examples, NMS 130 outputs notifications, such as alerts, alarms, graphical indicators on dashboards, log messages, text/SMS messages, email messages, and the like, and/or recommendations regarding wireless network issues to a site or network administrator ("admin") interacting with and/or operating admin device 111. Additionally, in some examples, NMS 130 operates in response to configuration input received from the administrator interacting with and/or operating admin device 111.

The administrator and admin device 111 may comprise IT personnel and an administrator computing device associated with one or more of sites 102. Admin device 111 may be implemented as one or more suitable devices for presenting output and/or accepting user input. For instance, admin device 111 may include a display. Admin device 111 may be a computing system, such as a mobile or non-mobile computing device operated by a user and/or by the administrator. Admin device 111 may, for example, represent a workstation, a laptop or notebook computer, a desktop computer, a tablet computer, or another computing device that may be operated by a user and/or present a user interface in accordance with one or more aspects of the present disclosure. Admin device 111 may be physically separate from and/or in a different location than NMS 130 such that admin device 111 may communicate with NMS 130 via network 134 or other means of communication.

In some examples, one or more of the NAS devices, e.g., APs 142, switches 146, or routers, may connect to edge devices 150A-150N via physical cables, e.g., Ethernet cables. Edge devices 150 comprise cloud-managed, wireless local area network (LAN) controllers. Each of edge devices 150 may comprise an on-premises device at a site 102 that is in communication with NMS 130 to extend certain microservices from NMS 130 to the on-premises NAS devices while using NMS 130 and its distributed software architecture for scalable and resilient operations, management, troubleshooting, and analytics.

Each one of the network devices of network system 100, e.g., servers 110, 116, 122 and/or 128, APs 142, UEs 148, switches 146, and other servers or devices attached to or forming part of network system 100, may include a system log or an error log module wherein each one of these network devices records the status of the network device including normal operational status and error conditions. Throughout this disclosure, one or more of the network devices of network system 100, e.g., servers 110, 116, 122 and/or 128, APs 142, UEs 148, and switches 146, may be considered "third-party" network devices when owned by and/or associated with a different entity than NMS 130 such that NMS 130 does not receive, collect, or otherwise have access to the recorded status and other data of the third-party network devices. In some examples, edge devices 150 may provide a proxy through which the recorded status and other data of the third-party network devices may be reported to NMS 130.

In some examples, NMS 130 monitors network data 137, e.g., one or more service level expectation (SLE) metrics, received from wireless networks 106A-106N at each site 102A-102N, respectively, and manages network resources, such as APs 142 at each site, to deliver a high-quality wireless experience to end users, IoT devices and clients at the site. For example, NMS 130 may include a virtual network assistant (VNA) 133 that implements an event processing platform for providing real-time insights and simplified troubleshooting for IT operations, and that automatically takes corrective action or provides recommendations to proactively address wireless network issues. VNA 133 may, for example, include an event processing platform configured to process hundreds or thousands of concurrent streams of network data 137 from sensors and/or agents associated with APs 142 and/or nodes within network 134. For example, VNA 133 of NMS 130 may include an underlying analytics and network error identification engine and alerting system in accordance with various examples described herein. The underlying analytics engine of VNA 133 may apply historical data and models to the inbound event streams to compute assertions, such as identified anomalies or predicted occurrences of events constituting network error conditions. Further, VNA 133 may provide real-time alerting and reporting to notify a site or network administrator via admin device 111 of one or more predicted events, anomalies, trends, and may perform root cause analysis and automated or assisted error remediation. In some examples, VNA 133 of NMS 130 may apply machine learning techniques to identify the root cause of error conditions detected or predicted from the streams of network data 137. If the root cause may be automatically resolved, VNA 133 may invoke one or more corrective actions to correct the root cause of the error condition, thus automatically improving the underlying SLE metrics and also automatically improving the user experience.

Further example details of operations implemented by the VNA 133 of NMS 130 are described in U.S. Pat. No. 9,832,082, issued Nov. 28, 2017, and entitled "Monitoring Wireless Access Point Events," U.S. Publication No. US 2021/0306201, published Sep. 30, 2021, and entitled "Network System Fault Resolution Using a Machine Learning Model," U.S. Pat. No. 10,985,969, issued Apr. 20, 2021, and entitled "Systems and Methods for a Virtual Network Assistant," U.S. Pat. No. 10,958,585, issued Mar. 23, 2021, and entitled "Methods and Apparatus for Facilitating Fault Detection and/or Predictive Fault Detection," U.S. Pat. No. 10,958,537, issued Mar. 23, 2021, and entitled "Method for Spatio-Temporal Modeling," and U.S. Pat. No. 10,862,742, issued Dec. 8, 2020, and entitled "Method for Conveying AP Error Codes Over BLE Advertisements," all of which are incorporated herein by reference in their entirety.

In operation, NMS 130 may observe, collect and/or receive network data 137, which may take the form of data extracted from one or more distance measurements, messages, counters, and statistics, for example. In accordance with one specific implementation, a computing device is part of NMS 130. In accordance with other implementations, NMS 130 may comprise one or more computing devices, dedicated servers, virtual machines, containers, services, or other forms of environments for performing the techniques described herein. Similarly, computational resources and components implementing VNA 133 may be part of the NMS 130, may execute on other servers or execution environments, or may be distributed to nodes within network 134 (e.g., routers, switches, controllers, gateways, and the like).

In accordance with one or more techniques of this disclosure, NMS 130 may be configured to grant client devices 148 access to resources based on determined, physical locations of client devices 148. NMS 130 may be configured to utilize UWB technology of devices of sites 102 to accurately determine locations of client devices 148. In some instances, client devices 148 and APs 142 may each include a UWB chipset with UWB antennas. For example, client devices 148 and APs 142 may each implement UWB technology in accordance with IEEE 802.15.4z-2020 entitled "IEEE Standard for Low-Rate Wireless Networks-Amendment 1: Enhanced Ultra Wideband (UWB) Physical Layers (PHYs) and Associated Ranging Techniques," which is incorporated by reference herein in its entirety. In this way, client devices 148 and APs 142 may be able to interact with each other such that NMS 130 may determine the location of client devices 148 and/or APs 142 with relatively high accuracy (e.g., within one meter of an actual location of client device 148 and/or APs 142).

In the example of FIG. 1A, NMS 130 may include ultra-wideband (UWB) secure ranging session module 135. UWB secure ranging session module 135 may initiate a UWB secure ranging session between at least two devices at one of sites 102. UWB secure ranging session module 135 may initiate a UWB secure ranging session by generating and sending encryption keys to the at least two devices involved in a particular UWB secure ranging session. UWB secure ranging session module 135 may, for example, generate encryption keys for the UWB secure ranging session according to an Advanced Encryption Standard (AES) (e.g., AES-128 deterministic random bit generator (DRBG)). In some instances, UWB secure ranging session module 135 may include scrambled timestamp sequence (STS) fields in the encryption keys. For example, UWB secure ranging session module 135 may generate encryption keys that include STS fields with one or more sequences of pseudo-randomized pulses generated from AES-128 bits.

UWB secure ranging session module 135 may send the generated encryption keys that include STS fields to the at least two devices involved in the UWB secure ranging session. UWB secure ranging session module 135 may send encryption keys that include STS fields to the at least two devices such that the at least two devices may securely communicate (e.g., receive and/or transmit pulses for distance measurements) using the received encryption keys generated for the UWB secure ranging session. UWB secure ranging session module 135 may send the encryption keys over secure channels provided by a secure connection between NMS 130 and devices involved in the UWB secure ranging session. In this way, NMS 130 may ensure that distance measurements obtained based on the UWB secure ranging session are secure against both accidental interference and intentional malicious attacks.

In the example of FIG. 1A, NMS 130 may include conditional access module 136 to enforce policies or business rules associated with accessing a particular resource. Conditional access module 136 may communicate with AAA server 110, via network 134, to determine whether a requesting device may be granted access to a particular resource, and enforce policies or business rules associated with restricted resources. For example, NMS 130 may store a business rule or policy specifying a requesting UE (e.g., client devices 148) must satisfy one or more requirements associated with the location of the requesting UE. In this example, when a requesting UE at a site requests to access a resource via one of APs 142 or another NAS device, UWB secure ranging session module 135 of NMS 130 initiates a UWB secure ranging session between the requesting UE device and at least one other device at the site, e.g., the one of APs 142 or the NAS device or another UE device. UWB secure ranging session module 135 may obtain one or more distance measurements from the requesting UE device and/or the at least one other device involved in the UWB secure ranging session. UWB secure ranging session module 135 may relay the one or more distance measurements to conditional access module 136 to determine whether the one or more distance measurements satisfy requirements to access a requested resource according to business rules or policies associated with the requested resource. In some instances, conditional access module 136 may issue network access certificates or a token to a requesting UE if the requesting UE satisfies requirements associated with the obtained distance measurements. In some examples, conditional access module 136 may notify AAA server 110 that the requesting UE was issued a network access certificate or token such that AAA server 110 may provide the requested resource to the requesting UE as long as the requesting UE maintains a valid network access certificate or token.

In operation, NMS 130 may obtain a request from one or more of client devices 148 via one of APs 142 or another NAS device. NMS 130 may obtain a request to access a secure resource. For example, NMS 130 may obtain a request to access a resource such as a network resource, a computational resource, an encrypted electronic document, a web site, a sensitive system, a computing device, a service set identifier (SSID) for access to a local area network, a software application, or the like.

NMS 130 may initiate an UWB secure ranging session based on receiving a request to access a resource. For example, client device 148A-1 may request access to a resource associated with a business rule or access policy stored in NMS 130. NMS 130, or more specifically conditional access module 136, may store a business rule or access policy that requires a requesting UE (e.g., client device 148A-1) to be in a certain spatial proximity to at least one of APs 142A-1-142A-M. In an example, client device 148A-1 may request access to the resource associated with the business rule or access via AP 142A-1.

For example, NMS 130, and more specifically UWB secure ranging session module 135, may initiate an UWB secure ranging session between requesting client device 148A-1 and other client devices 148 (e.g., client device 148A-N) or one or more network devices, such as APs 142, switches 146, or other NAS devices at site 102A. UWB secure ranging session module 130 may initiate the UWB secure ranging session by generating encryption keys. UWB secure ranging session module 135 may generate encryption keys according to AES-128 that include STS fields of the key. For example, UWB secure ranging session module 135 may generate encryption keys with STS fields that may include a pulse sequence generated using an AES-128 algorithm (e.g., AES-128 deterministic random bit generator (DRBG)).

Continuing the above example, NMS 130, or more specifically UWB secure ranging session module 135, may generate encryption keys that may be processed by UWB chipsets of the requesting client device 148A-1 and by the UWB chipset of the one or more network devices of site 102A (e.g., AP 142A-1). For example, UWB secure ranging session module 135 may generate encryption keys according to a UWB physical layer (PHY) protocol. UWB secure ranging session module 135 may include STS fields in encryption keys by adding a generated pulse sequence to a high-rate pulse repetition frequency (HRP) UWB physical layer (PHY) frame structure. UWB secure ranging session module 135 may include STS fields in generated encryption keys to validate a timing position of a reference marker (RMARKER) included in sequences communicated between the requesting client device 148A-1 and at least one other device, e.g., AP 142A-1, in site 102A that may be used to calculate one or more distance measurements between the requesting client device 148A-1 and the at least one other device, e.g., AP 142A.1, involved in the UWB secure ranging session.

In some instances, UWB secure ranging session module 135 may initiate a UWB secure ranging session between at least two devices to obtain one or more distance measurements based on the UWB secure ranging session. Continuing the above example, client device 148A-1 may request access to a resource that requires a requesting UE to be within a particular spatial proximity to AP 142A-1. Client device 148A-1 may send the request for the resource to NMS 130 via one of the NAS devices of site 102A. NMS 130, or more specifically conditional access module 136, may determine that the requested resource requires a certain spatial proximity to AP 142A-1 based on business rules or access policies maintained by NMS 130 and/or AAA server 110. Conditional access module 136 may send instructions to UWB secure ranging session module 135 to obtain one or more distance measurements between the requesting client device 148A-1 and the AP 142A-1. UWB secure ranging session module 135 may generate encryption keys for a UWB secure ranging session and send the encryption keys to client device 148A-1 and AP 142A-1. UWB secure ranging session module 135 may send the encryption keys to client device 148A-1 via a first secure channel between client device 148A-1 and NMS 130. UWB secure ranging session module 135 may send the encryption keys to AP 142A-1 via a second secure channel between AP 142A-1 and NMS 130. UWB secure ranging session module 135 may send encryption keys to devices involved in the UWB secure ranging session via secure channel connections (e.g., a RadSec tunnel or another encrypted tunnel) between NMS 130 and devices involved in the UWB secure ranging session. Client device 148A-1 and AP 142A-1 may use the encryption keys to reliably send and receive pulses to each other to determine one or more distance measurements used in authenticating whether client device 148A-1 may access a requested resource according to a business rule or access policy managed by NMS 130 and/or AAA server 110.

NMS 130, or more specifically UWB secure ranging session module 135, may obtain one or more distance measurements between devices involved in a UWB secure ranging session, in this example client device 148A-1 and AP 142A-1. In some instances, UWB secure ranging session module 135 may obtain distance measurements that include physical time-of-flight (ToF) measurements between a requesting device and a reference device. UWB secure ranging session module 135 may obtain distance measurements that include an angle-of-arrival (AoA) that may represent, for example, the direction or angle client device 148A-1 is located with respect to AP 142A-1. For example, client device 148A-1 or AP 142A-1 may send a signal or electromagnetic pulse to AP 142A-1 or client device 148A-1, respectively. Client device 148A-1 and/or AP 142A-1 may send the signal or electromagnetic pulse using the received encryption key associated with the UWB secure ranging session that includes an STS field. AP 142A-1 and/or client device 148A-1 may receive the signal or electromagnetic pulse and generate a sequence based on characteristics of the received signal or electromagnetic pulse. For example, AP 142A-1 and/or client device 148A-1 may generate a sequence associated with one or more distance measurements (e.g., ToF, AoA, etc.) determined by applying a directional finding (DF) function. AP 142A-1 and/or client device 148A-1 may use a UWB chipset and a software module to apply the DF function to determine the one or more distance measurements if the encryption key used to send the signal or electromagnetic pulse correlates to the encryption key received from UWB secure ranging session module 135. AP 142A-1 and/or client device 148A-1 may send the sequence associated with the one or more distance measurements to UWB secure ranging session module 135, via network 134, using a software module (e.g., a software application client, Software Service, software agent, etc.). In some instances, AP 142A-1 and/or client device 148A-1 may send the one or more distance measurements to NMS 130 as network data 137. UWB secure ranging session module 135 may confirm whether the obtained one or more distance measurements were obtained during a particular UWB secure ranging session using the STS fields included in the generated encryption keys to validate the timing position of an RMARKER included in the sequence associated with the one or more distance measurements.

UWB secure ranging session module 135 may relay the obtained one or more distance measurements associated with a requesting UE to conditional access module 136 to determine whether the requesting UE may be granted access to a requested resource. For example, UWB secure ranging session module 135 may relay one or more distance measurements obtained from either requesting client device 148A-1 and/or reference AP 142A-1 to conditional access module 136. UWB secure ranging session module 135 may relay one or more distance measurements, such as ToF or AoA associated with electromagnetic pulses sent between requesting client device 148A-1 and reference AP 142A-1. Conditional access module 136 may determine a location of requesting computing device 148A-1 based on the obtained distance measurements. In some examples, conditional access module 136 may determine a location of client device 148A-1 with respect to a spatial proximity (e.g., within one meter) client device 148A-1 is to reference AP 142A-1. Conditional access module 136 may compare the determined location of client device 148A-1 with a business rule or access policy to determine whether computing device 148A-1 may be granted access to a requested resource. For example, client device 148A-1 may request access to a resource with an access policy specifying that a requesting UE may not be more than five meters away from AP 142A-1. In this example, conditional access module 136 may use the obtained one or more distance measurements to determine that client device 148A-1 is two meters away from AP 142A-1. Conditional access module 136 may compare the determined location of client device 148A-1 with the access policy associated with the requested resource and confirm that client device 148A-1 satisfies the requirements of the access policy. Conditional access module 136 may then grant client device 148A-1 access to the requested resource. In some examples, conditional access module 136 may send AAA server 110 a positive indication that the requesting computing device has satisfied requirements of the access policy. AAA server 110 may then implement a Single Sign-On (SSO) for the requesting computing device to access the resource.

In some instances, AAA server 110 may verify whether a requesting device satisfies requirements to access a resource. For example, NMS 130 may send the distance measurements obtained during the UWB secure ranging session to AAA server 110 via network 134 (e.g., NMS 130 may send AAA server 110 the distance measurements as a web hook). AAA server 110 may process the distance measurements to determine whether a requesting device satisfies location, spatial, positional, etc. requirements of a business rule or access policy associated with the request resource. AAA server 110 may implement Single Sign-On (SSO), Single Logout (SLO), Multi-factor Authentication (MFA), or other techniques for providing access to resource to grant, revoke, or otherwise verify whether login information and location information of a requesting UE satisfies requirements to access a resource. In some example, AAA server 110 may execute conditional access module 136.

Conditional access module 136 and/or AAA server 110 may maintain a map of standalone devices that include a UWB chipset and corresponding UWB antennas. In some examples, APs 142, switches 146, and edge devices 150 may be UWB beacons in accordance with the techniques of this disclosure. Conditional access module 136 may determine one or more zones associated with business rules or access policies for resources managed by NMS 130 and AAA server 110 based on the map of the UWB beacons. When NMS 130 receives a request to access a resource associated with a business rule or access policy specifying the resource may only be accessed when the requesting device is within a particular zone with respect to UWB beacons, NMS 130 may initiate a UWB secure ranging session between the requesting device and the UWB beacons. NMS 130 may then obtain distance measurements based on the UWB secure ranging session between the requesting device and the UWB beacons to determine a location or spatial proximity of the requesting device with respect to the UWB beacons. Based on the location or spatial proximity determined by NMS 130, NMS 130 and/or AAA server 110 may grant access to the requesting device if the determined location satisfies spatial proximity, location, or position requirements specified in a business rule or access policy associated with the requested resource.

Conditional access module 136 and/or AAA server 110 may determine the requirements of the access policy are no longer satisfied. Conditional access module 136 and/or AAA server 110 may revoke access to the resource for the requesting computing device. In some instances, NMS 130 may monitor the position or location of a requesting client device to determine whether there is a change of location of the requesting client device. NMS 130, or more specifically UWB secure ranging session module 135, may send encryption keys to devices involved in a UWB secure ranging session continuously, periodically, or responsive to one or more events. UWB secure ranging session module 135 and/or conditional access module 136 may obtain multiple sets of one or more distance measurements that include a timestamp associated with when the distance measurements were taken. Conditional access module 136 may continuously or periodically determine whether a requesting UE continues to satisfy a business rule or access policy associated with a resource the requesting UE was previously granted access to. Conditional access module 136 may continuously or periodically determine whether a requesting UE continues to satisfy a business rule or access policy associated with a resource based on a change of location determined with sets of one or more distance measurements obtained throughout the entire UWB secure ranging session. In some examples, conditional access module 136 may determine a change of location of the requesting UE is a location or physical position that violates a business rule or access policy associated with a previously granted resource. Conditional access module 136 may, for example, send instructions to AAA server 110 to initiate a Single Logout (SLO) and block access of the requested resource to the requesting UE. In some instances, conditional access module 136 and/or AAA server 110 may manage access to a resource by using a token or other types of encrypted authentication keys. Conditional access module 136 and/or AAA server 110 may issue or provide a physical UWB token to a requesting UE when granting the UE access to the resource. Conditional access module 136 and/or AAA server 110 may revoke a token issued to a requesting UE when the requesting UE no longer satisfies criteria associated with a business rule or access policy for a resource.

In some instances, conditional access module 136 and AAA server 110 may regulate access to many different types of resources. For example, conditional access module 136 may regulate access to resources such as a web site, electronic document, computing device, a SSID for a wireless local area network, or other type of high-level resource that may typically be managed by AAA server 110 and/or NMS 130. Conditional access module 136 may enforce business rules or access policies specifying requirements or criteria for a requested resource. Conditional access module 136 may enforce business rules or access policies relating to a location, position, spatial proximity, etc. of a requesting device. For example, conditional access module 136 may enforce business rules or access policies requiring a requesting device to be in a specific physical zone, within a certain spatial proximity to a reference device, within a specific room, within a certain spatial proximity or position to of a quorum of devices (e.g., minimum number devices), etc.

An example use case will now be described in which an access policy for a resource requires a requesting device to be within a spatial zone relative to a reference device to gain access to the resource. UWB secure ranging session module 135 may initiate an UWB secure ranging session between a requesting UE, e.g., client device 148A-1, and one or more APs based on an access policy specifying a requesting UE must be within a designated zone defined with respect to the one or more APs. In some examples, conditional access module 136 may maintain a map of a site (e.g., site 102A) that may include location information of one or more devices in the site (e.g., APs 142A, switch 146A, edge device 150A, etc.). Conditional access module 136 and/or AAA server 110 may enforce a business rule or access policy that only grants access to a resource if a requesting UE is within a spatial zone relative to one or more reference devices in the site. When a UE (e.g., client device 148A-1) requests access to a resource associated with the business rule or access policy in this example, UWB secure ranging session module 135 may initiate a UWB secure ranging session between a requesting UE and one or more devices associated with the conditional access policy for the requested resource. Conditional access module 136 may obtain the one or more distance measurements between the requesting UE and the devices specified in the access policy to determine the spatial proximity or location of the requesting UE with respect to the devices involved in the UWB secure ranging session. Conditional access module 136 may determine whether the spatial proximity or location of the requesting UE satisfies the access policy. Conditional access module 136, or alternatively AAA server 110, may grant access to the requesting UE if the determined spatial proximity or location of the requesting UE satisfies the access policy.

An example use case will now be described in which an access policy for a resource requires a quorum to access a resource. For example, conditional access module 136 and/or AAA server 110 may enforce an access policy requiring a requesting device to be in spatial proximity to a specific number of other devices. Client device 148A-1 may send a request via a NAS device of site 102A to access a resource associated with an access policy allowing access to the resource if a certain number of devices are within a particular spatial proximity to each other. In response to obtaining a request originating from client device 148A-1 to access the resource associated with the quorum requirement, NMS 130 may initiate an UWB secure ranging session between client device 148A-1 and other client devices 148A. In some examples, NMS 130 may initiate an UWB secure ranging session between client device 148A-1 and other NAS devices of site 102A (e.g., APs 142A), as well as a UWB secure ranging session between other client devices of client devices 148A and the NAS devices of site 102A-based on the particular quorum requirement associated with the access policy. NMS 130 may obtain one or more sets of distance measurements based on the one or more UWB secure ranging sessions to determine whether a quorum or a minimum number of client devices 148A are present in a spatial proximity to each other. For example, NMS 130 may obtain a first set of distance measurements between client device 148A-1 and AP 142A-1 and a second set of distance measurements between client device 148A-N and AP 142A-1 or between client device 148A-N and client device 148A-1. NMS 130, or more specifically conditional access module 136, may determine a count of a number of devices in proximity to requesting client device 148A-1 based on the sets of distance measurements. In response to NMS 130 determining the count of the number of devices in proximity to client device 148A-1 satisfies the quorum requirement associated with the resource, NMS 130 and/or AAA server 110 may grant client device 148A-1 access to the resource. If, while client device 148A-1 is accessing the resource, NMS 130 determines that the quorum requirement associated with the resource is no longer satisfied, NMS 130 and/or AAA server 110 may initiate logout techniques to restrict access to the resource such that client device 148A-1—or other client devices requesting access to the resource—may no longer access the resource.

An example use case will now be described in which an access policy for a resource requires a quorum in a designated zone to access a resource. For example, conditional access module 136 and/or AAA server 110 may enforce a business rule or access policy that requires a particular number of a particular type of device (e.g., three of client devices 148A) to be in a zone (e.g., site 102A, within a room of site 102A, spatial proximity to at least one of APs 142A, etc.) to satisfy a quorum in a designated zone requirement. When client device 148A-1 requests access to the resource associated with the quorum in a designated zone access policy, NMS 130, or more specifically UWB secure ranging session module 135, may initiate a UWB secure ranging session between client device 148A-1, AP 142A-1, and client device 148A-N, for example. NMS 130 may obtain a first set of distance measurements between client device 148A-1 and AP 142A-1, as well as a second set of distance measurements between client device 148A-N and AP 142A-1 or between client device 142A-N and client device 142A-1. NMS 130 may determine a location of client device 148A-1 based on the set of distance measurements between client device 148A-1 and AP 142A-1. NMS 130 may determine a location of client device 148A-N based on the set of distance measurements between client device 148A-N and AP 142A-1 and/or the set of distance measurements between client device 148A-N and client device 148A-1. NMS 130 may determine—according to the access policy associated with the requested resource-a count of a number of devices within a spatial zone relative to AP 142A-1 based on determined locations of client device 148A-1 and client device 148A-N. In response to NMS 130 determining the count of the number of devices within the spatial zone relative to AP 142A-1 satisfies the quorum in a spatial zone access policy, NMS 130 may provide client device 148A-1, as well as client device 148-N, access to the resource.

An example use case will now be described in which a location based access policy may regulate access to a resource such as contents of a computing device. For example, conditional access module 135 and AAA server 110 may enforce a business rule or access policy associated with a resource that may include login access to profiles or content of a computing device. For example, conditional access module 135 and AAA server 110 may enforce an access policy that requires a requesting UE (e.g., client device 148A-1) to be in a certain spatial proximity to or distance from a computing device (e.g., client device 148A-N) to access specific resources of the computing device (e.g., locally stored data on the computing device). In this example, client device 148A-N may include resources protected by a software module (e.g., a software application client, Software Service, software agent, etc.) that enables communication between client device 148A-N and NMS 130 via at least one NAS device of a network site of network system 100. NMS 130, or more specifically UWB secure ranging session module 135, may initiate an UWB secure ranging session between client device 148A-1 and client device 148A-N. NMS 130 may obtain one or more distance measurements based on the UWB secure ranging session between client device 148A-1 and client device 148A-N. NMS 130, or more specifically conditional access module 136, may determine a location, spatial proximity, or position of client device 148A-1 with respect to client device 148A-N. Conditional access module 136 and/or AAA server 110 may determine whether the location, spatial proximity, or position of client device 148A-1 satisfies the access policy associated with access to protected resources stored on client device 148A-N. In response to conditional access module 136 and/or AAA server 110 determining the location, spatial proximity, or position of client device 148A-1 satisfies the access policy, conditional access module 136 and/or AAA server 110 may grant client device 148A-1 access to protected resources stored on client device 148A-N by sending client device 148A-1 a token. In this way, client device 148A-1 may act as a physical UWB token. NMS 130 may continue to obtain distance measurements between client device 148A-1 and client device 148A-N to determine whether the token provided to client device 148A-1 is still valid according to the access policy associated with access to client device 148A-N.

An example use case will now be described in which a location based access policy may regulate access to a resource based on a detected number of persons. For example, conditional access module 135 and/or AAA server 110 may enforce a business rule or access policy that utilizes radar capabilities of the UWB-enabled devices involved in an UWB secure ranging session. For example, conditional access module 135 may enforce a resource access policy that requires an UWB-enabled AP 142A-1 to detect a certain number of persons present in a designated secure zone in order to grant a requesting client device access to the resource. AP 142A-1 may use UWB radar capabilities of an integrated UWB chipset to estimate heart or respiration rates within a certain proximity of AP 142A-1. AP 142A-1 may begin to count the number of persons in a designated zone in response to receiving encryption keys generated by UWB secure ranging session module 135. AP 142A-1 may relay a number of detected persons to conditional access module 136 to verify whether a requesting client device satisfies the network access policy.

The techniques of this disclosure provide one or more technical advantages and practical applications. For example, the techniques enable a network management system to securely determine a location of a requesting device with relatively high accuracy (e.g., within a decimeter). The network management system may leverage UWB enabled devices to determine the location of a requesting device to grant access to a resource based on the determined location. The network management system may apply UWB technology to determine a location of a requesting device based on electromagnetic pulses between the requesting device and one or more reference devices. In this way, the network management system may mitigate playback and/or man-in-the-middle (MiM) attacks. The network management system adopts a UWB protocol to provide encryption on a physical layer (PHY) such that faking or spoofing of a reference device at a PHY level is difficult. In addition, the network management system may securely send encryption keys to devices via a secure channel (e.g., a RadSec tunnel or another encrypted tunnel). The network management system may further prevent unauthorized access to a resource based on a false location by maintaining a map of reference devices. The network management system may maintain a map that includes a location of reference devices relative to each other. In this way, the network management system may be able to detect whether a reference device has been moved to attempt unauthorized access to a requested resource.

Although the techniques of the present disclosure are described in this example as performed by NMS 130, techniques described herein may be performed by other computing device(s), system(s), and/or server(s), and that the disclosure is not limited in this respect. For example, one or more computing device(s) configured to execute the functionality of the techniques of this disclosure may reside in a dedicated server or be included in other servers in addition to or other than NMS 130, or may be distributed throughout network 100, and may or may not form a part of NMS 130.

Figure 1B:
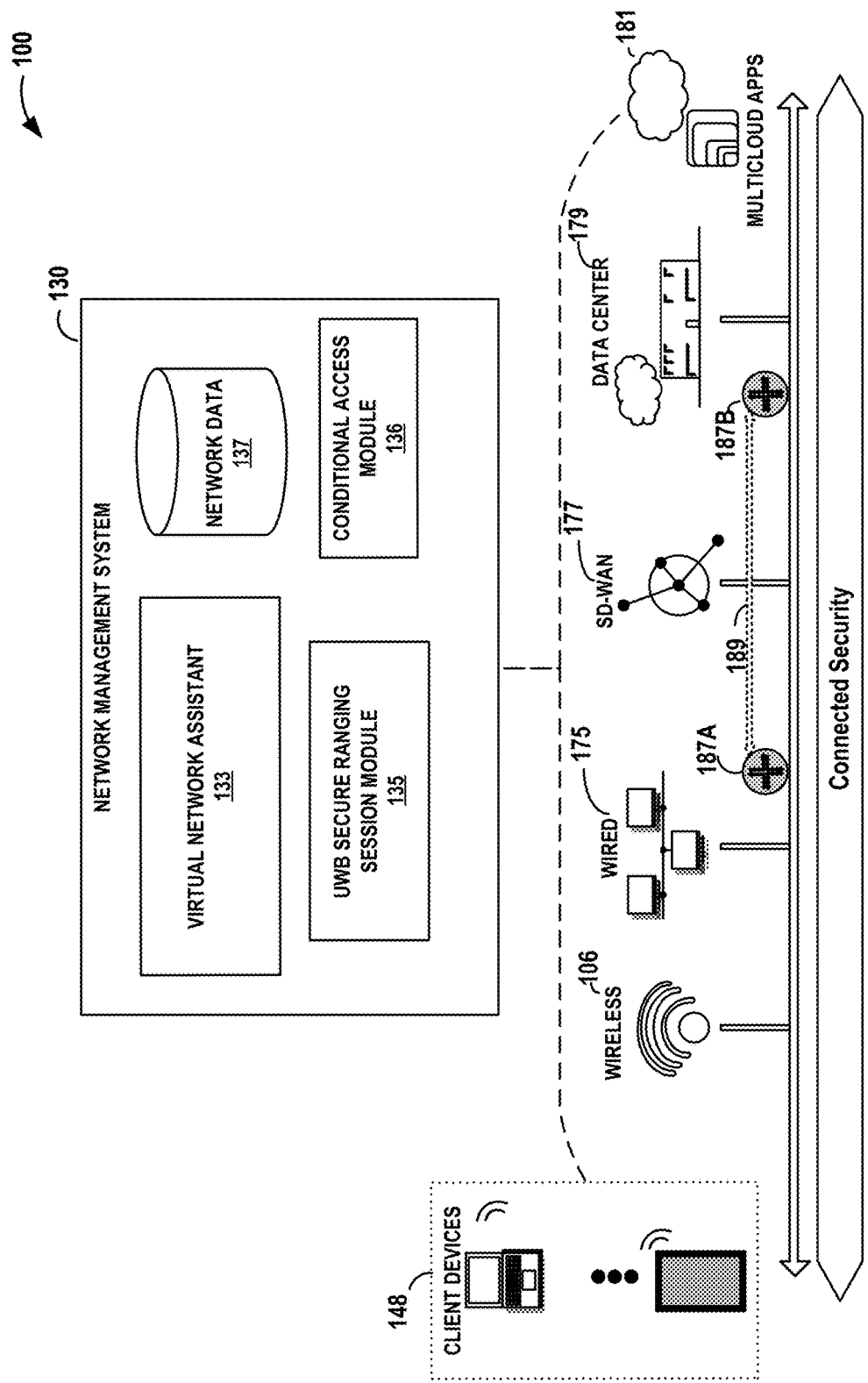
FIG. 1B is a block diagram illustrating further example details of the network system of FIG. 1A.

FIG. 1B is a block diagram illustrating further example details of the network system of FIG. 1A. In this example, FIG. 1B illustrates NMS 130 configured to operate according to an artificial intelligence/machine-learning-based computing platform providing comprehensive automation, insight, and assurance (WiFi Assurance, Wired Assurance and WAN assurance) spanning from "client," e.g., user devices 148 connected to wireless network 106 and wired LAN 175 (far left of FIG. 1B), to "cloud," e.g., cloud-based application services 181 that may be hosted by computing resources within data centers 179 (far right of FIG. 1B).

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-driven radio frequency (RF) optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by client devices 148 to steer traffic along selected paths, e.g., path 189, toward application services 181 without requiring use of tunnels and/or additional labels. In this way, routers 187A, 187B may be more efficient and scalable for large networks since the use of tunnel-less, session-based routing may enable routers 187A, 187B to achieve considerable network resources by obviating the need to perform encapsulation and decapsulation at tunnel endpoints. Moreover, in some examples, each router 187A, 187B may independently perform path selection and traffic engineering to control packet flows associated with each session without requiring use of a centralized SDN controller for path selection and label distribution. In some examples, routers 187A, 187B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Pat. No. 11,075,824, entitled "IN-LINE PERFORMANCE MONITORING," and issued on Jul. 27, 2021, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

In accordance with the techniques described in this disclosure, NMS 130 may grant one or more of client devices 148 access to a requested resource based on a determined location, position, spatial proximity, etc. of a requesting client device. For example, conditional access module 136 of NMS 130 may receive a request-via one of the NAS devices of a network site-originating from a client device 148 to access a resource. Client devices 148 may request access to a resource hosted by application services 181 and/or data center 179. Client devices 148 may, for example, request access to a resource such as a web site, electronic document, computing device, a SSID for a wireless local area network, or other type of high-level resource. In some instances, client devices 148 may send NMS 130 the request to access a resource via at least one NAS device of a site of network system 100. Client devices 148 may include login information (e.g., username, password, etc.) associated with the requested resource in the request for the resource. NMS 130, or more specifically conditional access module 136, may preliminarily determine whether the received login information corresponds to login information associated with the requested resource. In response to conditional access module 136 determining the received login information corresponds to login information associated with the requested resource, conditional access module 136 may send instructions to UWB secure ranging session module 135 to initiate an UWB secure ranging session between one or more requesting client devices 148 and at least one reference device with UWB technology (e.g., UWB beacons).

NMS 130, or more specifically UWB secure ranging session module 135, may initiate an UWB secure ranging session between requesting client devices 148 and one or more reference devices such as one or more UWB beacons. UWB secure ranging session module 135 may initiate a secure ranging session between a client device of client devices 148 requesting access to a resource and UWB beacons associated with a business rule or access policy requiring a requesting device must be in a certain location, spatial proximity, physical position, etc. with respect to the UWB beacons. For example, client devices 148 may request access to a resource associated with a business rule requiring requesting devices to be within the same room as a UWB beacon (e.g., at least one device of wireless network 106 and/or at least one device of wired network 175). NMS 130, or more specifically UWB secure ranging session module 135, may initiate an UWB secure ranging session between the requesting client devices 148 and the UWB beacon. UWB secure ranging session module 135 may initiate an UWB secure ranging session by sending encryption keys to the requesting client devices 148 and the UWB beacon. UWB secure ranging session module 135 may send the requesting client devices 148 and the UWB beacon encryption keys that include STS fields to ensure that location, spatial, or positional information determined during the UWB secure ranging session is accurate, secure, and in real-time. UWB secure ranging session module 135 may send the encryption keys to requesting client devices 148 and the UWB beacon via secure channel connections. Client devices 148 and the UWB beacon may obtain the encryption keys using software modules (e.g., a software application client, Software Service, software agent, etc.) executing on client devices 148 and the UWB beacon. Client devices 148 and the UWB beacon may send electromagnetic pulses to each other to obtain distance measurements such a ToF or AoA. NMS 130 may obtain the distance measurements from client devices 148 and/or the UWB beacon to determine a location, physical position, or spatial proximity the requesting client devices 148 are to the UWB beacon. NMS 130 may grant requesting client devices 148 access to a requested resource as long as the determined location, physical position, or spatial proximity of the requesting client devices 148 satisfy criteria associated with the business rule regulating access to the requested resource.

NMS 130, or more specifically conditional access module 136, may enforce the business rule requiring requesting devices to be within the same room as the UWB beacon to access the resource by maintaining a map specifying a location of the UWB beacon within the room. For example, conditional access module 136 may maintain a map specifying the room by including distances the UWB beacon is from the edges of the room. Conditional access module 136 may grant access to requesting client devices 148 by verifying if the determined location of requesting client devices 148 satisfies the requirement of the business rule that the requesting client devices 148 is within the same room as the UWB beacon. Conditional access module 136 may verify whether the requesting client devices 148 are in the same room as the UWB beacon by comparing the determined location of the requesting client devices 148 to the map maintained by conditional access module 136. In response to conditional access module 136 verifying that the requesting client devices 148 are in the same room as the UWB beacon, conditional access module 136 may grant access to client devices 148 as long as distance measurements from the UWB secure ranging session indicate the requesting client devices 148 are still in the room. Conditional access module 136 may grant client devices 148 access to the resource by sending a token or network access certificate to a software module executing on client devices 148. Conditional access module 136 may send a token to client devices 148 that may include configuration information, credentials, access keys, etc. that enables users of client devices 148 to access the resource. Conditional access module 136 may revoke the token provided to client devices 148 in response to distance measurements obtained during a UWB secure ranging session no longer indicating the requesting client devices 148 satisfies the business rule or access policy associated with the resource.

Figure 1C:
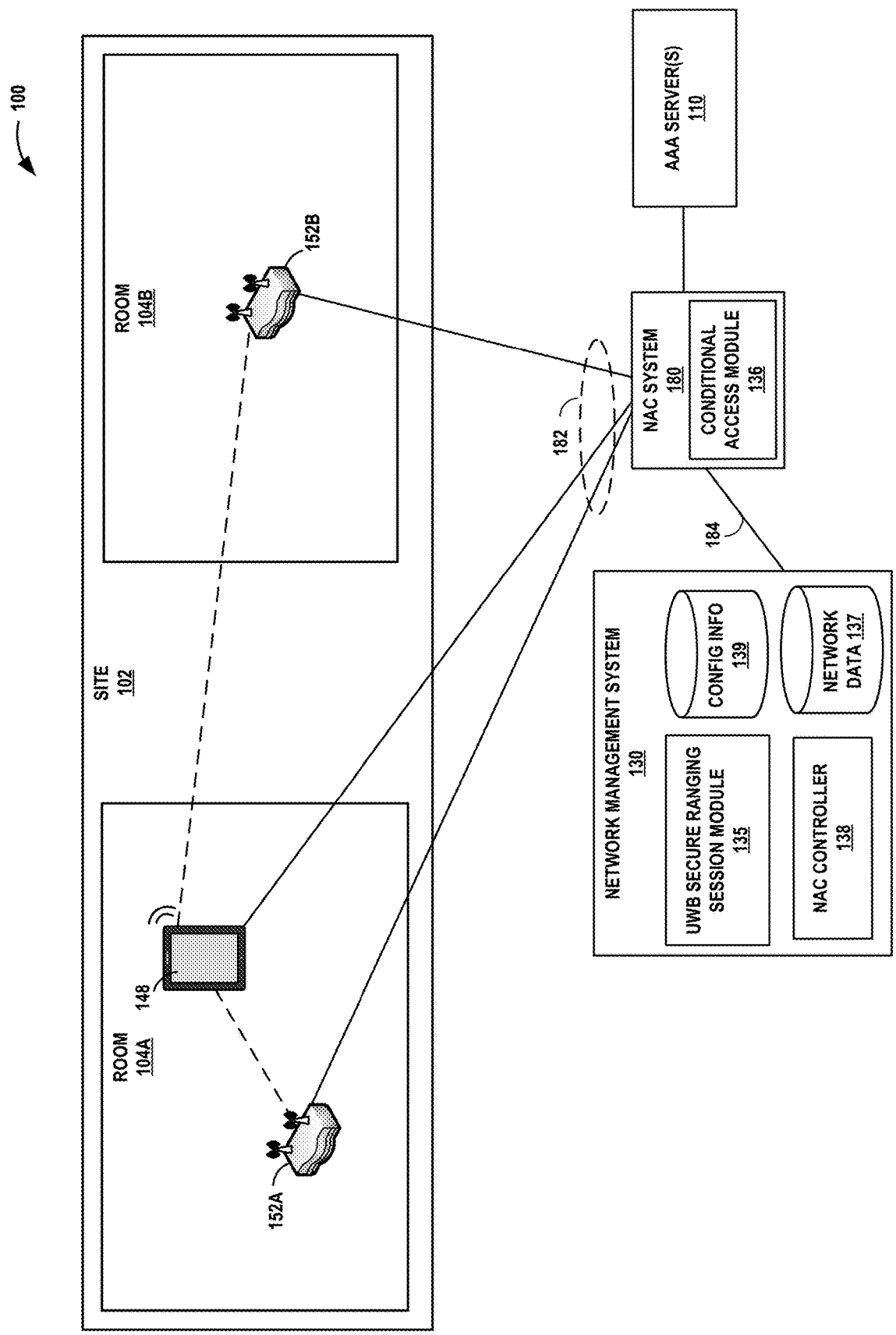
FIG. 1C is a block diagram illustrating another example of the network system of FIG. 1A.

FIG. 1C is a block diagram illustrating further example details of the network system of FIG. 1A, in accordance with the techniques described herein. In this example, FIG. 1C illustrates example network system 100 that includes NMS 130, network access control (NAC) system 180, AAA server(s) 110, UWB beacons 152, and client device 148. NAC system 180 may include or provide access to AAA servers 110 for authenticating users and/or client device 148. NAC system 180 may include a cloud-based network access control service at site 102. Typically, network access control functionality is offered by on-premises appliances that are limited by processing power and memory as well as maintenance and upgrade issues. Offering cloud-based network access control services avoids the limitations and improves network administration. A centralized, cloud-based deployment of network access control, however, introduces issues with latency and failures that may block client devices from network access.

As illustrated in the example of FIG. 1C, NMS 130 may include NAC controller 138 that implements a NAC configuration platform that provides a user interface to create and assign access policies for client device 148, and provides the appropriate enterprise-specific configuration information 139 to NAC system 180. NMS 130 is configured to manage NAC configuration, including access policies for enterprise networks, and push the appropriate NAC configuration data or files to NAC system 180. In this way, NAC system 180 may provide the same benefits as a centralized, cloud-based network access control service with lower latency and high availability.

NMS 130 may have a secure connection 184, e.g., a RadSec tunnel or another encrypted tunnel, with NAC system 180. Through secure connection 184, NAC system 180 may download the appropriate configuration information 139 from NMS 130. In some examples, NAC controller 138 may log or map which enterprise networks are served by NAC system 180.

NAC system 180 may provide a way of authenticating client device 148 to access resources (e.g., web-site access, electronic document access, network access, etc.) managed by administrators branch or campus enterprise networks. NAC system 180 may provide a way of authenticating device access credentials based on business rules or access policies established by administrators of networks. NAC system 180 may provide a way of authenticating device credentials for business rules or access policies requiring requesting devices to be in a certain location, spatial proximity, or position based on distance measurements obtained during a tamper-proof UWB secure ranging session. NAC systems 180 may each include or provide access to one or more Authentication, Authorization, and Accounting (AAA) servers 110, e.g., a RADIUS server, to authenticate client device 148 prior to providing access to resources. In some examples, NAC system 180 may enable certificate-based authentication of client device 148 or enable interaction with user directory services, e.g., an active directory, to authenticate client device 148. NAC system 180 may supplement conditional access authentication systems (e.g., IaM systems, AAA servers 110, Identity Service Provider, etc.) with location information of client device 148 obtained during a UWB secure ranging session. In the example of FIG. 1C, NAC system 180 may include conditional access module 136.

NAC system 180 may identify client device 148 and provide client device 148 with the appropriate authorizations or access policies based on the identity associated with client device 148, e.g., by assigning client device 148 to a virtual local area network (VLAN), applying certain access control lists (ACLs), directing client device 148 to certain registration portals, or the like. NAC systems 180 may identify client device 148 by analyzing network behavior of client device 148, referred to as fingerprinting. Identification of client devices and/or NAS devices may be performed based on media access control (MAC) addresses, DHCP options used to request IP addresses, link layer discovery protocol (LLDP) packets, Hypertext Transfer Protocol (HTTP) user agent information, location information, DNS information, and/or device type and operating system information. In some instances, NAC system 180 may provide client device 148 with appropriate authorizations or access based on a location of client device 148 determined using a UWB secure ranging session. For example, NAC system 180 may implement location-based conditional access based on a location of client device 148 in relation to other UWB-enabled devices such as client devices, one or more devices of site 102, etc. In the example of FIG. 1C, NAC system 180 may determine the location of client device 148 in relation to UWB beacon 152A and UWB beacon 152B (collectively referred to herein as "UWB beacons 152"). UWB beacons 152 may include one or more types of devices with UWB chipsets and corresponding UWB antennas. For example, UWB beacons 152 may include at least one of client devices 148, APs 142, switches 146, or edge devices 150. UWB beacons 152 may include UWB antennas that comply with mandatory emission mask given by the Federal Communications Commission (FCC) or other regulatory bodies. UWB beacons 152 may, for example, yield an absolute bandwidth no less than 500 MHz or a fractional bandwidth (i.e., the bandwidth of the device divided by its center frequency) of at least 0.2.

Client device 148 of FIG. 1C may include multiple different categories of devices with respect to a given enterprise, such as trusted enterprise devices, bring-your-own-device (BYOD) devices, IoT devices, and guest devices. NAC system 180 may be configured to subject each of the different categories of devices to different types of tracking, different types of authorization, and different levels of access privileges. In some examples, after a client device gains access to the enterprise network or resources managed by an administrator of the enterprise network, NAC system 180 may monitor activities of the client device to identify security concerns and, in response, re-assign the client device to a quarantine VLAN or another less privileged VLAN to restrict access of the client device.

In the example illustrated in FIG. 1C, client device 148 and UWB beacons 152 has a direct, secure connection 182 to NAC system 180, e.g., a RadSec tunnel or another encrypted tunnel. In some examples, devices of site 102 (e.g., client device 148 or UWB beacons 152) may have an indirect connection to NAC system 180 via an edge device (not shown in FIG. 1C). Devices of site 102 may not support establishment of a secure connection directly with NAC system 180, but an edge device (e.g., edge devices 150 of FIG. 1A) may provide a proxy through which devices may connect to NAC system 180. For example, client device 148 may have a direct connection (e.g., RADIUS tunnel) to an edge device, and the edge device has a direct, secure connection (e.g., connection 182) to NAC system 180.

In accordance with the techniques described in this disclosure, NMS 130 may grant client device 148 access to a requested resource based on a determined location of client device 148. NMS 130 may receive resource access requests from client device 148 via at least one NAS device of site 102. NMS 130 may execute UWB secure ranging session module 135 to initiate an UWB secure ranging session to determine whether client device 148 satisfies location-based conditional access requirements. NAC system 180 may obtain the one or more distance measurements generated based on the UWB secure ranging session. For example, NMS 130 may collect distance measurements from the UWB secure ranging session as network data 137 and send the distance measurements to conditional access module 136 of NAC system 180 via secure connection 184. NAC system 180, or more specifically conditional access module 136, may determine a location, position, or spatial proximity of client device 148 based on the distance measurements (e.g., ToF, AoA, etc.) obtained during the UWB secure ranging session. NAC system 180 may determine the location of client device 148 by determining the spatial proximity of client device 148 with respect to UWB beacons 152. In some examples, NAC system 180 may maintain a map of a physical location of UWB beacons 152 within site 102, and more specifically within rooms 104. NAC system 180 may maintain a map of rooms in which UWB beacons are located, such as room 104A and room 104B. NAC system 180 may maintain a map of the location of UWB beacons 152 and/or rooms of site 102 based on configuration information provided by an administrator of network system 100 and/or based on distance measurements obtained from UWB beacons 152 and other UWB-enabled devices of site 102. NAC system 180 may determine the location of client device 148 based on distance measurements from a UWB secure ranging session and the map.

NAC system 180 and/or AAA server 110 may grant client device 148 access to a requested resource based on a determined location of client device 148. For example, NAC system 180 and/or AAA servers 110 may enforce a business rule or access policy, associated with a requested resource, that requires client device 148 to be within the same room as UWB beacon 152A (e.g., room 104A) or in the same room as UWB beacon 152B (e.g., room 104B). NAC system 180 may receive distance measurements from the UWB secure ranging session between client device 148 and UWB beacons 152. For example, NAC system 180 may receive distance measurements including a ToF and/or AoA calculated based on an electromagnetic signal sent by client device 148 to UWB beacons 152 and/or an electromagnetic signal sent by UWB beacons 152 to client device 148. NAC system 180 may, for example, determine that client device 148 is within the same room (e.g., room 104A) as UWB beacon 152A but in a different room than UWB beacon 152B. NAC system 180 may determine whether client device 148 is in the same room as at least one of UWB beacons 152 based on the obtained distance measurements and a map of rooms UWB beacons 152 are located in. In this example, since NAC system 180 determined client device 148 is in the same room as UWB beacon 152A, NAC system 180 and/or AAA server 110 may grant client device 148 access to the resource.

Figure 2:
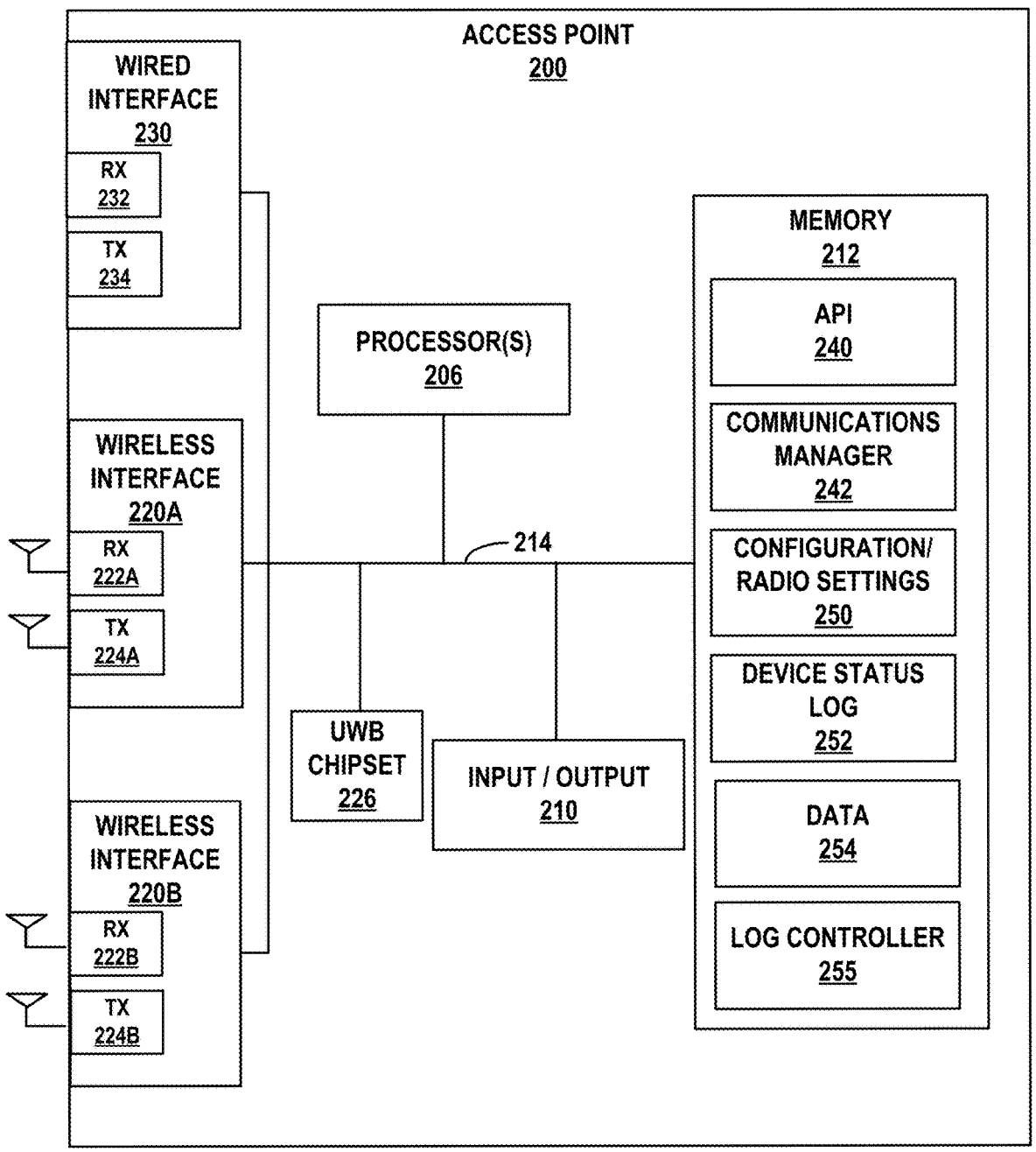
FIG. 2 is a block diagram of an example access point device, in accordance with one or more techniques of this disclosure.

FIG. 2 is a block diagram of an example access point (AP) device 200, in accordance with one or more techniques of this disclosure. Example access point 200 shown in FIG. 2 may be used to implement one or more of APs 142 as shown and described herein with respect to FIG. 1A. Access point 200 may comprise, for example, a Wi-Fi, Bluetooth and/or Bluetooth Low Energy (BLE) base station or other type of wireless access point.

In the example of FIG. 2, access point 200 includes a wired interface 230, wireless interfaces 220A-220B one or more processor(s) 206, memory 212, and input/output 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point 200 to a wired network device, such as one of switches 146 of FIG. 1A, within the wired network via a cable, such as an Ethernet cable.

First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1A. First and second wireless interfaces 220A and 220B further include transmitters 224A and 224B, respectively, each including transmit antennas via which access point 200 may transmit wireless signals to wireless communications devices, such as UEs 148 of FIG. 1A. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or other type of volatile or non-volatile memory, that stores instructions to cause the one or more processors 206 to perform the techniques described herein.

Memory 212 includes one or more devices configured to store programming modules and/or data associated with operation of access point 200. For example, memory 212 may include a computer-readable storage medium, such as non-transitory computer-readable mediums including a storage device (e.g., a disk drive, or an optical drive) or a memory (such as Flash memory or RAM) or other type of volatile or non-volatile memory, that stores instructions to cause the one or more processor(s) 206 to perform the techniques described herein.

In this example, memory 212 stores executable software including an application programming interface (API) 240, a communications manager 242, configuration settings 250, a device status log 252, data storage 254, and log controller 255. Device status log 252 includes a list of events specific to access point 200. The events may include a log of both normal events and error events such as, for example, memory status, reboot or restart events, crash events, cloud disconnect with self-recovery events, low link speed or link speed flapping events, Ethernet port status, Ethernet interface packet errors, upgrade failure events, firmware upgrade events, configuration changes, etc., as well as a time and date stamp for each event. Log controller 255 determines a logging level for the device based on instructions from NMS 130. Data 254 may store data used and/or generated by access point 200, including data collected from UEs 148, such as data used to calculate one or more SLE metrics, that is transmitted by access point 200 for cloud-based management of wireless networks 106A by NMS 130.

Input/output (I/O) 210 represents physical hardware components that enable interaction with a user, such as buttons, a display, and the like. Although not shown, memory 212 typically stores executable software for controlling a user interface with respect to input received via I/O 210. Communications manager 242 includes program code that, when executed by processor(s) 206, allow access point 200 to communicate with UEs 148 and/or network(s) 134 via interface(s) 230 and/or 220A-220C. Configuration settings 250 may include device settings for access point 200 such as radio settings for each of wireless interface(s) 220A-220C. These settings may be configured manually or may be remotely monitored and managed by NMS 130 to optimize wireless network performance on a periodic (e.g., hourly or daily) basis.

As described herein, AP device 200 may measure and report network data from status log 252 to NMS 130. The network data may comprise event data, telemetry data, and/or other SLE-related data. The network data may include various parameters indicative of the performance and/or status of the wireless network. The parameters may be measured and/or determined by one or more of the UE devices and/or by one or more of the APs in a wireless network. NMS 130 may determine one or more SLE metrics based on the SLE-related data received from the APs in the wireless network and store the SLE metrics as network data 137 (FIG. 1A).

In the example of FIG. 2, AP device 200 may act as a UWB beacon (e.g., UWB beacons 152 of FIG. 1C). AP device 200 may include UWB chipset 226 may include a transmitter and/or antennas used for short-range wireless communication. UWB chipset 226 may include one or more modules to configure UWB chipset 226 to comply with UWB communication protocols. UWB chipset 226 may use frequencies from 3.1 GHz to 10.6 GHz. UWB chipset 226 may include a channel bandwidth of 500 MHz, which results in accurate location determination (e.g., within one meter of an actual location) during UWB secure ranging sessions. UWB chipset 226 may be configured to implement encryption mechanisms to prevent faking or spoofing the location of AP 200.

Figure 3:
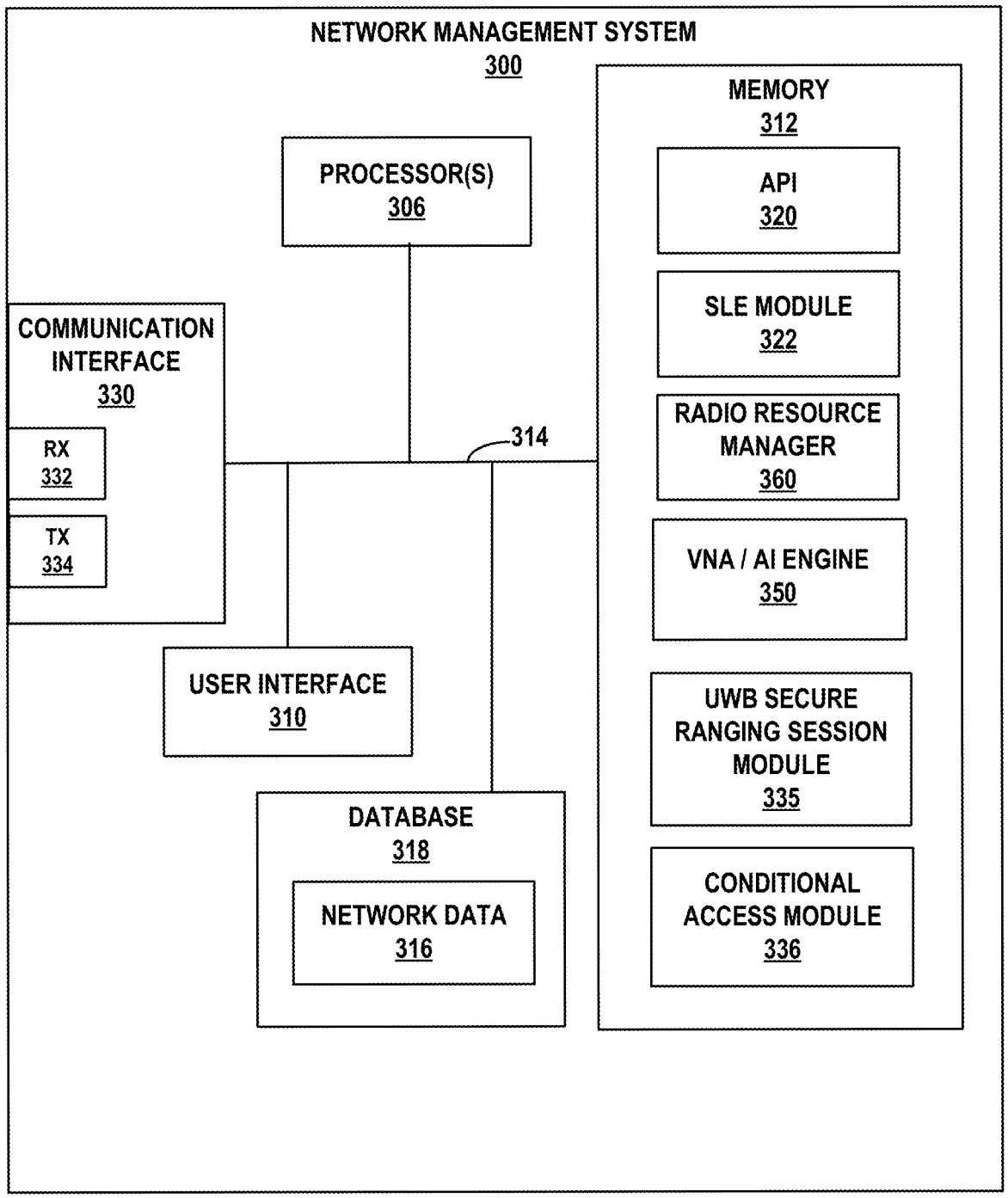
FIG. 3 is a block diagram of an example network management system, in accordance with one or more techniques of the disclosure.

FIG. 3 is a block diagram of an example network management system (NMS) 300, in accordance with one or more techniques of the disclosure. NMS 300 may be used to implement, for example, NMS 130 in FIGS. 1A-1B. In such examples, NMS 300 is responsible for monitoring and management of one or more wireless networks 106A-106N at sites 102A-102N, respectively.

NMS 300 includes a communications interface 330, one or more processor(s) 306, a user interface 310, a memory 312, and a database 318. The various elements are coupled together via a bus 314 over which the various elements may exchange data and information. In some examples, NMS 300 receives data from one or more of client devices 148, APs 142, switches 146 and other network nodes within network 134, e.g., routers 187 of FIG. 1B, which may be used to calculate one or more SLE metrics and/or update network data 316 in database 318. NMS 300 analyzes this data for cloud-based management of wireless networks 106A-106N. In some examples, NMS 300 may be part of another server shown in FIG. 1A or a part of another server not shown.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as network(s) 134 as shown in FIG. 1A, and/or local area networks. Communications interface 330 includes a receiver 332 and a transmitter 334 by which NMS 300 receives/transmits data and information to/from of client devices 148, APs 142, switches 146, servers 110, 116, 122, 128 and/or other network nodes, devices, or systems forming part of network system 100 such as shown in FIG. 1A. In some scenarios described herein in which network system 100 includes "third-party" network devices that are owned and/or associated with different entities than NMS 300, NMS 300 does not receive, collect, or otherwise have access to network data from the third-party network devices.

The data and information received by NMS 300 may include, for example, telemetry data, SLE-related data, or event data received from one or more of client device APs 148, APs 142, switches 146, or other network nodes, e.g., routers 187 of FIG. 1B, used by NMS 300 to remotely monitor the performance of wireless networks 106A-106N and application sessions from client device to cloud-based application server. NMS 300 may further transmit data via communications interface 330 to one or more network devices such as client devices 148, APs 142, switches 146, other network nodes within network 134, admin device 111 to remotely manage wireless networks 106A-106N and portions of the wired network.

Memory 312 includes one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or other type of volatile or non-volatile memory, that stores instructions to cause the one or more processor(s) 306 to perform the techniques described herein.

In this example, memory 312 includes an API 320, an SLE module 322, a virtual network assistant (VNA)/AI engine 350, and a radio resource management (RRM) engine 360. In accordance with the disclosed techniques, NMS 300 may include UWB secure ranging session module 335 for initiating an UWB secure ranging session between a requesting device and one or more reference devices to determine the location of the requesting device. NMS 300 may also include other programmed modules, software engines and/or interfaces configured for remote monitoring and management of wireless networks 106A-106N and portions of the wired network, including remote monitoring and management of APs 142/200, switches 146, or other network devices, e.g., routers 187 of FIG. 1B.

SLE module 322 enables set up and tracking of thresholds for SLE metrics for each network 106A-106N. SLE module 322 further analyzes SLE-related data collected by APs, such as APs 142 from UEs in each wireless network 106A-106N. For example, APs 142A-1 through 142A-N collect SLE-related data from UEs 148A-1 through 148A-N currently connected to wireless network 106A. This data is transmitted to NMS 300, which executes by SLE module 322 to determine one or more SLE metrics for each UE 148A-1 through 148A-N currently connected to wireless network 106A. This data, in addition to network data collected by one or more APs 142A-1 through 142A-N in wireless network 106A, is transmitted to NMS 300 and stored as, for example, network data 316 in database 318.

RRM engine 360 monitors one or more metrics for each site 102A-102N in order to learn and optimize the RF environment at each site. For example, RRM engine 360 may monitor the coverage and capacity SLE metrics for a wireless network 106 at a site 102 in order to identify potential issues with SLE coverage and/or capacity in the wireless network 106 and to make adjustments to the radio settings of the access points at each site to address the identified issues. For example, RRM engine may determine channel and transmit power distribution across APs 142 in each network 106A-106N. For example, RRM engine 360 may monitor events, power, channel, bandwidth, and number of clients connected to each AP. RRM engine 360 may further automatically change or update configurations of one or more APs 142 at a site 102 with an aim to improve the coverage and capacity SLE metrics and thus to provide an improved wireless experience for the user.

VNA/AI engine 350 analyzes data received from network devices as well as its own data to identify when undesired to abnormal states are encountered at one of the network devices. For example, VNA/AI engine 350 may identify the root cause of undesired or abnormal states, e.g., poor SLE metric(s) indicative of connected issues at one or more network devices. In addition, VNA/AI engine 350 may automatically invoke one or more corrective actions intended to address the identified root cause(s) of one or more poor SLE metrics. Examples of corrective actions that may be automatically invoked by VNA/AI engine 350 may include, but are not limited to, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoking downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel, e.g., a site or network administrator using admin device 111, to address the network error.

In accordance with one or more techniques of this disclosure, NMS 300 may grant a device access to a resource based on a determined physical location of the requesting device. NMS 300 may receive a request-originating from a device (e.g., client devices 148 of FIG. 1A)—to access a secured resource. NMS 130 may receive the request to access the resource via communication interface 330. In response to receiving the request to access the resource, NMS 130, or more specifically UWB secure ranging session module 335, may initiate an UWB secure ranging session between the requesting device and one or more other reference devices. NMS 130 may obtain one or more distance measurements (e.g., ToF, AoA, etc.) from the requesting device and/or reference devices. NMS 130 may obtain the distance measurements via communication interface 330. NMS 130, or more specifically conditional access module 336, may determine the location of the requesting device based on the distance measurements to verify whether the requesting device satisfies criteria or requirements associated with access to the requested resource.

In some instances, NMS 130 may enable an administrator to establish business rules or access policies to regulate access to a resource. For example, UI 310 may provide a platform for the administrator to input business rules or access policies that require a requesting device to be in a specific location, spatial proximity, or position with respect to one or more reference devices.

Conditional access module 336 of NMS 300 may maintain a map of reference devices to determine the location of the requesting UE based on distance measurements obtained during a UWB secure ranging session between the requesting device and the reference devices. Conditional access module 336 may maintain a map of reference device location via distance measurements obtained with the UWB functionality of the reference devices. In some examples, conditional access module 36 may maintain a map configured by an administrator of NMS 300. Conditional access module 336 may accurately determine the location of a requesting device based on obtained distance measurements and the map of the locations of reference devices used in UWB secure ranging sessions. Conditional access module 336 may implement an SSO, SLO, and/or MFA functions to effectively regulate access to a resource. For example, conditional access module 336 may implement MFA to initially authenticate a requesting device, then-depending on an access policy associated with a requested resource-conditional access module 336 may require that a location of the requesting computing device satisfies location-based requirements of the access policy. Conditional access module 336 may implement SSO and/or SLO by issuing and/or revoking a token associated with whether a requesting device satisfies location-based criteria associated with access to a resource.

The techniques of this disclosure provide one or more technical advantages and practical applications. For example, NMS 300 may grant, monitor, and/or revoke access to a resource based on an accurate location of a requesting device. NMS 300 may utilize UWB technology and protocols to accurately determine the location, spatial proximity, or position of a requesting device within one meter, for example. NMS 300 may use UWB technology to determine the location of devices in a site, a building, etc. NMS 300 may establish location-based zones in buildings that can be used to regulate access to a resource (e.g., NMS 300 defining a zone or room of a building that a requesting device must be in order to access a specific WiFi WLAN). NMS 300 may additionally utilize encryption mechanisms associated with UWB technology (e.g., including STS fields in encryption keys used in UWB secure ranging sessions) to mitigate faking or spoofing of locations used in determining a requesting device's access to a resource. In this way, NMS 300 may securely and accurately determine a location of a requesting device to verify whether the requesting device may granted access to a resource.

Although the techniques of the present disclosure are described in this example as performed by NMS 130, techniques described herein may be performed by other computing device(s), system(s), and/or server(s), and that the disclosure is not limited in this respect. For example, one or more computing device(s) configured to execute the functionality of the techniques of this disclosure may reside in a dedicated server or be included in another server in addition to or other than NMS 130, or may be distributed throughout network 100, and may or may not form a part of NMS 130.

Figure 4:
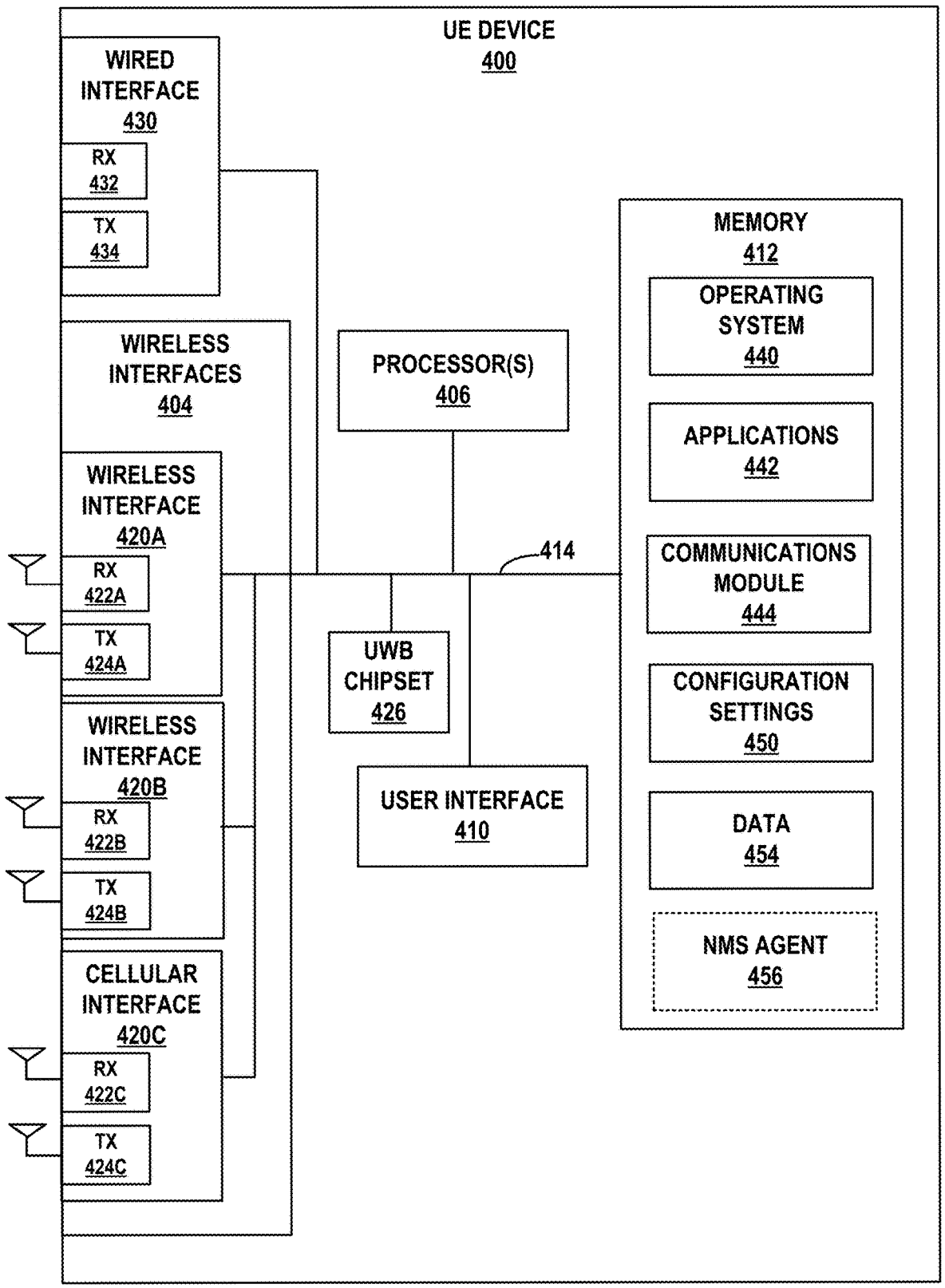
FIG. 4 is a block diagram of an example user equipment device, in accordance with one or more techniques of this disclosure.

FIG. 4 shows an example user equipment (UE) device 400, in accordance with one or more techniques of this disclosure. Example UE device 400 shown in FIG. 4 may be used to implement UEs 148 as shown and described herein with respect to FIG. 1A. UE device 400 may include one or more types of wireless client device, and the disclosure is not limited in this respect. For example, UE device 400 may include a mobile device such as a smart phone, tablet or laptop computer, a personal digital assistant (PDA), a wireless terminal, a smart watch, a smart ring, or other types of mobile or wearable device. In some examples, UE 400 may also include a wired client-side device, e.g., an IoT device such as a printer, a security sensor or device, an environmental sensor, or other devices connected to the wired network and configured to communicate over one or more wireless networks.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 represents a physical network interface and includes a receiver 432 and a transmitter 434. Wired interface 430 may be used, if desired, to couple, either directly or indirectly, UE 400 to a wired network device, such as one of switches 146 of FIG. 1A, within the wired network via a cable, such as one of Ethernet cables 144 of FIG. 1A.

First, second and third wireless interfaces 420A, 420B, and 420C include receivers 422A, 422B, and 422C, respectively, each including a receive antenna via which UE 400 may receive wireless signals from wireless communications devices, such as APs 142 of FIG. 1A, AP 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as APs 142 of FIG. 1A, AP 200 of FIG. 2, other UEs 148 and/or other devices configured for wireless communication. In some examples, first wireless interface 420A may include a Wi-Fi 802.11 interface (e.g., 2.4 GHz and/or 5 GHZ) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage 454. Communications module 444 includes program code that, when executed by processor(s) 406, enables UE 400 to communicate using wired interface(s) 430, wireless interfaces 420A-420B and/or cellular interface 450C. Configuration settings 450 may include device settings for UE 400 settings for each of wireless interface(s) 420A-420B and/or cellular interface 420C.

Data storage 454 may include, for example, a status/error log including a list of events specific to UE 400. The events may include a log of both normal events and error events according to a logging level based on instructions from NMS 130. Data storage 454 may store data used and/or generated by UE 400, such as data used to calculate one or more SLE metrics or identify relevant behavior data, that is collected by UE 400 and either transmitted directly to NMS 130 or transmitted to APs 142 in a wireless network 106 for further transmission to NMS 130.

As described herein, UE 400 may measure and report network data from data storage 454 to NMS 130. The network data may comprise event data, telemetry data, and/or other SLE-related data. The network data may include various parameters indicative of the performance and/or status of the wireless network. NMS 130 may determine one or more SLE metrics and store the SLE metrics as network data 137 (FIG. 1A) based on the SLE-related data received from the Ues or client devices in the wireless network.

Optionally, UE device 400 may include an NMS agent 456. NMS agent 456 is a software agent of NMS 130 that is installed on UE 400. In some examples, NMS agent 456 can be implemented as a software application running on UE 400. NMS agent 456 collects information including detailed client-device properties from UE 400, including insight into UE 400 roaming behaviors. The information provides insight into client roaming algorithms, because roaming is a client device decision. In some examples, NMS agent 456 may display the client-device properties on UE 400. NMS agent 456 sends the client device properties to NMS 130, via an AP device to which UE 400 is connected. NMS agent 456 can be integrated into a custom application or as part of location application. NMS agent 456 may be configured to recognize device connection types (e.g., cellular or Wi-Fi), along with the corresponding signal strength. For example, NMS agent 456 recognizes access point connections and their corresponding signal strengths. NMS agent 456 can store information specifying the APs recognized by UE 400 as well as their corresponding signal strengths. NMS agent 456 or other element of UE 400 also collects information about which APs the UE 400 connected with, which also indicates which APs the UE 400 did not connect with. NMS agent 456 of UE 400 sends this information to NMS 130 via its connected AP. In this manner, UE 400 sends information about not only the AP that UE 400 connected with, but also information about other APs that UE 400 recognized and did not connect with, and their signal strengths. The AP in turn forwards this information to the NMS, including the information about other APs the UE 400 recognized besides itself. This additional level of granularity enables NMS 130, and ultimately network administrators, to better determine the Wi-Fi experience directly from the client device's perspective.

In some examples, NMS agent 456 further enriches the client device data leveraged in service levels. For example, NMS agent 456 may go beyond basic fingerprinting to provide supplemental details into properties such as device type, manufacturer, and different versions of operating systems. In the detailed client properties, the NMS 130 can display the Radio Hardware and Firmware information of UE 400 received from NMS client agent 456. The more details the NMS agent 456 can draw out, the better the VNA/AI engine gets at advanced device classification. The VNA/AI engine of the NMS 130 continually learns and becomes more accurate in its ability to distinguish between device-specific issues or broad device issues, such as specifically identifying that a particular OS version is affecting certain clients.

In some examples, NMS agent 456 may cause user interface 410 to display a prompt that prompts an end user of UE 400 to enable location permissions before NMS agent 456 is able to report the device's location, client information, and network connection data to the NMS. NMS agent 456 will then start reporting connection data to the NMS along with location data. In this manner, the end user of the client device can control whether the NMS agent 456 is enabled to report client device information to the NMS.

In the example of FIG. 4, UE 400 may include UWB chipset 426. UE 400 may include UWB chipset 426 may include a transmitter and/or antennas used for short-range wireless communication. UWB chipset 426 may include module to configure UWB chipset 426 to comply with UWB communication protocols. UWB chipset 426 may use frequencies from 3.1 GHz to 10.6 GHz. UWB chipset 426 may include a channel bandwidth of 500 MHZ, which results in accurate location determination (e.g., within one meter of an actual location) during UWB secure ranging sessions. UWB chipset 426 may be configured to implement encryption mechanisms to prevent faking or spoofing the location of UE 400. In some examples, UE 400 may act as a UWB beacon (e.g., UWB beacons 152 of FIG. 1C) to determine the location of another UE requesting access to a resource.

Figure 5:
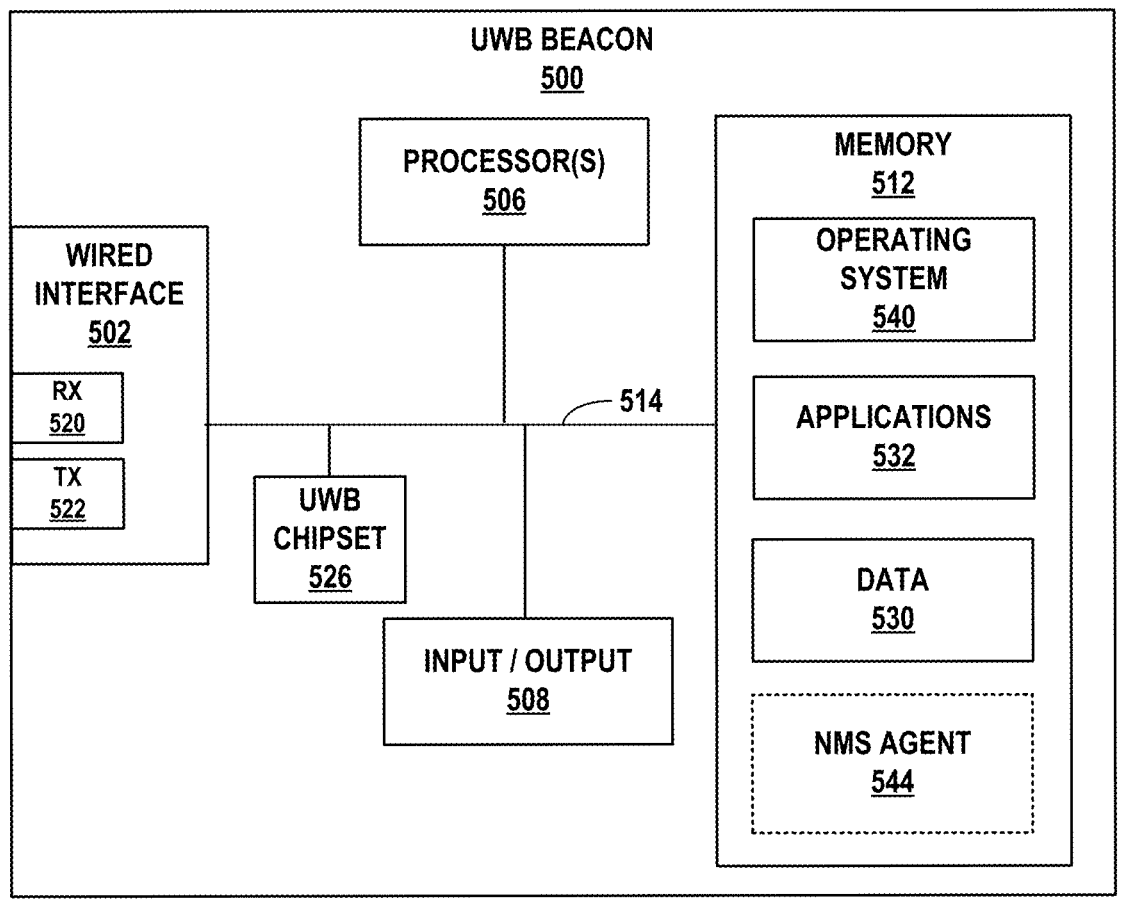
FIG. 5 is a block diagram of an example UWB beacon, such as a client device, AP, router or switch, in accordance with one or more techniques of this disclosure.

FIG. 5 is a block diagram of an example UWB beacon 500, such as a client device, AP, router or switch, in accordance with one or more techniques of this disclosure. UWB beacon 500, in the example of FIG. 5, may be an example of devices of sites 102 of FIG. 1A (e.g., client devices 148, APs 142, switches 146, edge devices 150, etc.). In one or more examples, the UWB beacon 500 implements a device or a server attached to the network 134 of FIG. 1A, e.g., switches 146, AAA server 110, DHCP server 116, DNS server 122, web servers 128, etc., or another network device supporting one or more of wireless network 106, wired LAN 175, or SD-WAN 177, or data center 179 of FIG. 1B, e.g., routers 187.

In this example, UWB beacon 500 includes a wired interface 502, e.g., an Ethernet interface, a processor 506, input/output 508, e.g., display, buttons, keyboard, keypad, touch screen, mouse, etc., and a memory 512 coupled together via a bus 514 over which the various elements may interchange data and information. Wired interface 502 couples the UWB beacon 500 to a network, such as an enterprise network. Though only one interface is shown by way of example, network nodes may, and usually do, have multiple communication interfaces and/or multiple communication interface ports. Wired interface 502 includes a receiver 520 and a transmitter 522.

In the example of FIG. 5, UWB beacon 500 may include UWB chipset 526. UWB chipset 526 may include a transmitter and/or antennas used for short-range wireless communication. UWB chipset 526 may include one or more modules to configure UWB chipset 526 to comply with UWB communication protocols. For example, UWB chipset 526 may use frequencies from 3.1 GHz to 10.6 GHz. UWB chipset 526 may include a channel bandwidth of 500 MHz, which results in accurate location determination (e.g., within one meter of an actual location) during UWB secure ranging sessions. UWB chipset 526 may be configured to implement encryption mechanisms to prevent faking or spoofing the location of UWB beacon 500.

Memory 512 stores executable software applications 532, operating system 540 and data/information 530. Data 530 may include a system log and/or an error log that stores event data, including behavior data, for UWB beacon 500. In examples where UWB beacon 500 comprises a "third-party" network device, the same entity does not own or have access to both the APs or wired client-side devices and UWB beacon 500. As such, in the example where UWB beacon 500 is a third-party network device, NMS 130 does not receive, collect, or otherwise have access to the network data from UWB beacon 500.

In examples where UWB beacon 500 comprises a server, UWB beacon 500 may receive data and information, e.g., including operation related information, e.g., registration request, AAA services, DHCP requests, Simple Notification Service (SNS) look-ups, and Web page requests via receiver 520, and send data and information, e.g., including configuration information, authentication information, web page data, etc. via transmitter 522.

In examples where UWB beacon 500 comprises a wired network device, UWB beacon 500 may be connected via wired interface 502 to one or more APs or other wired client-side devices, e.g., IoT devices. For example, UWB beacon 500 may include multiple wired interfaces 502 and/or wired interface 502 may include multiple physical ports to connect to multiple APs or the other wired-client-side devices within a site via respective Ethernet cables. In some examples, each of the APs or other wired client-side devices connected to UWB beacon 500 may access the wired network via wired interface 502 of UWB beacon 500. In some examples, one or more of the APs or other wired client-side devices connected to UWB beacon 500 may each draw power from UWB beacon 500 via the respective Ethernet cable and a Power over Ethernet (POE) port of wired interface 502.

The data collected and reported by UWB beacon 500 may include periodically-reported data and event-driven data. UWB beacon 500 is configured to collect logical path statistics via bidirectional forwarding detection (BFD) probing and data extracted from messages and/or counters at the logical path (e.g., peer path or tunnel) level. In some examples, UWB beacon 500 is configured to collect statistics and/or sample other data according to a first periodic interval, e.g., every 3 seconds, every 5 seconds, etc. UWB beacon 500 may store the collected and sampled data as path data, e.g., in a buffer.

In some examples, UWB beacon 500 optionally includes an NMS agent 544. NMS agent 544 may periodically create a package of the statistical data according to a second periodic interval, e.g., every 3 minutes. The collected and sampled data periodically-reported in the package of statistical data may be referred to herein as "oc-stats." In some examples, the package of statistical data may also include details about clients connected to UWB beacon 500 and the associated client sessions. NMS agent 544 may then report the package of statistical data to NMS 130 in the cloud. In other examples, NMS 130 may request, retrieve, or otherwise receive the package of statistical data from UWB beacon 500 via an API, an open configuration protocol, or another of communication protocols. The package of statistical data created by NMS agent 544 or another module of UWB beacon 500 may include a header identifying UWB beacon 500 and the statistics and data samples for each of the logical paths from UWB beacon 500. In still other examples, NMS agent 544 reports event data to NMS 130 in the cloud in response to the occurrence of certain events at UWB beacon 500 as the events happen. The event-driven data may be referred to herein as "oc-events."

Figure 6:
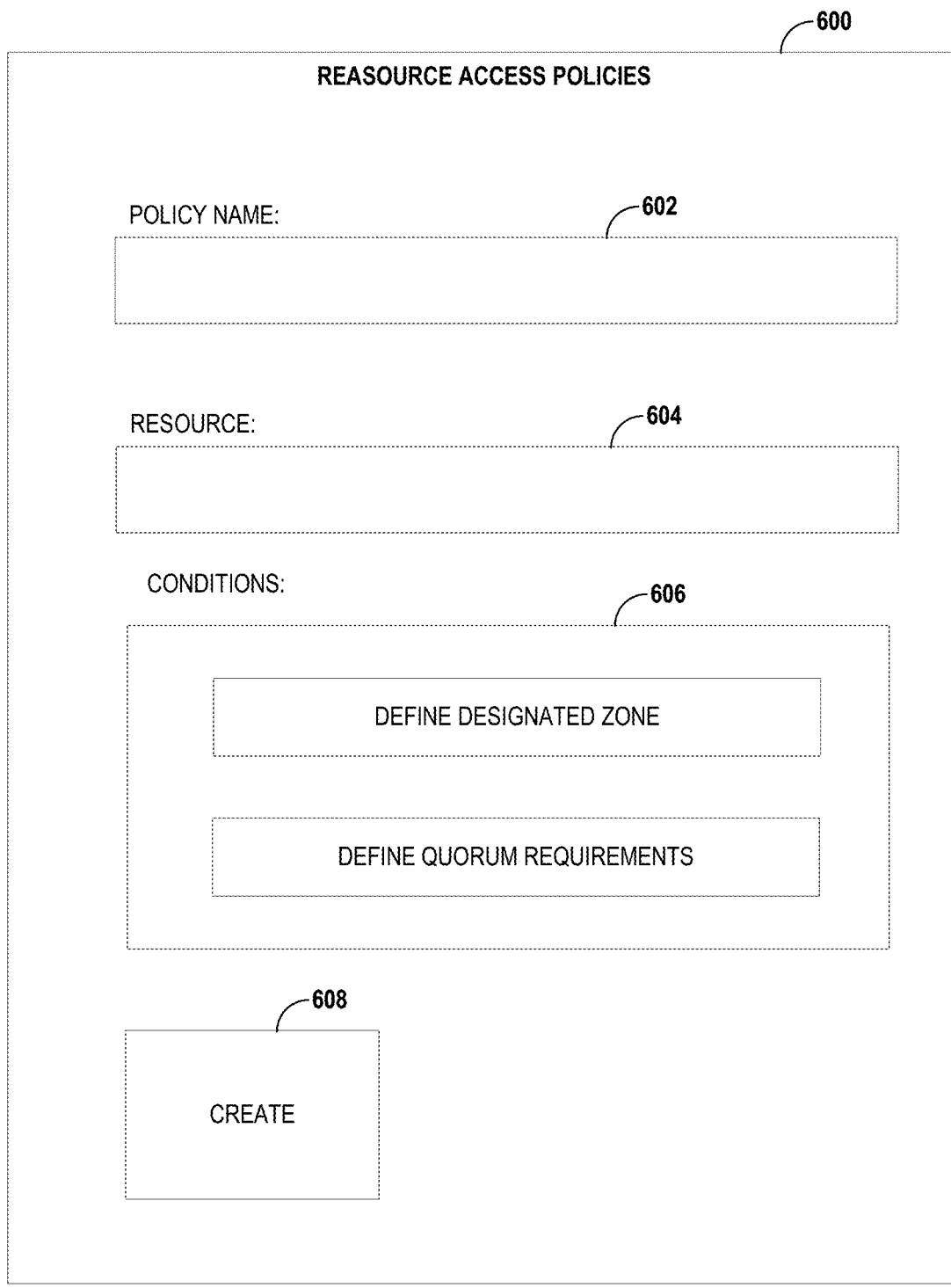
FIG. 6 illustrates an example graphical user interface for creating resource access policies.

FIG. 6 illustrates an example graphical user interface 600 for creating resource access policies. Graphical user interface 600 may include fields and/or options allowing an administrator to establish resource access policies. Graphical user interface 600 may include data generated by NMS 130 of FIG. 1A, for example. NMS 130 may generate data representative of graphical user interface 600 for display by admin device 111 of FIG. 1A. Admin device 111 may receive input from users to create a resource access policy via graphical user interface 600. In the example of FIG. 6, graphical user interface 600 may include policy name field 602, resource field 604, condition field 606, and create field 608.

Graphical user interface 600 may receive an input specifying a name for a resource access policy in policy name field 602. Graphical user interface 600 may receive an input defining a resource to be regulated by the resource access policy in resource field 604. For example, graphical user interface 600 may receive an input of a file path, media access control (MAC) address, Internet Protocol (IP) address, or other type of information defining a resource that may be restricted by the resource access policy.

Graphical user interface 600 may receive inputs defining conditions for when and/or how the resource access policy may grant access to the resource defined in resource field 604. Graphical user interface 600 may receive condition definitions associated with access to the resource in conditions field 606. Graphical user interface 600 may receive location-based conditions associated with access to the resource defined in resource field 604. Conditions field 606 may output one or more recommendations of types of location-based conditions that may be assigned to the resource access policy. For example, conditions field 606 may output options to "define a designated zone" or "define quorum requirements" that may be used to restrict or otherwise regulate access to a resource defined in resource field 604. Conditions field 606 may include a map (e.g., location or proximity data associated with UWB beacons) for a zone, for example, as an input to define a designated zone. Conditions field 606 may include a count of required devices (e.g., number and/or type of UEs that must be located a certain distance from a requesting UE) as an input to define quorum requirements. Conditions field 606 may include one or more conditions for the resource access policy. Graphical user interface 600 may include create field 608 to push the resource access policy to NMS 130 and/or AAA server 110 of FIG. 1A, for example. In some examples, create field 608 may output options defining when to begin enforcing the newly created resource access policy.

Figure 7:
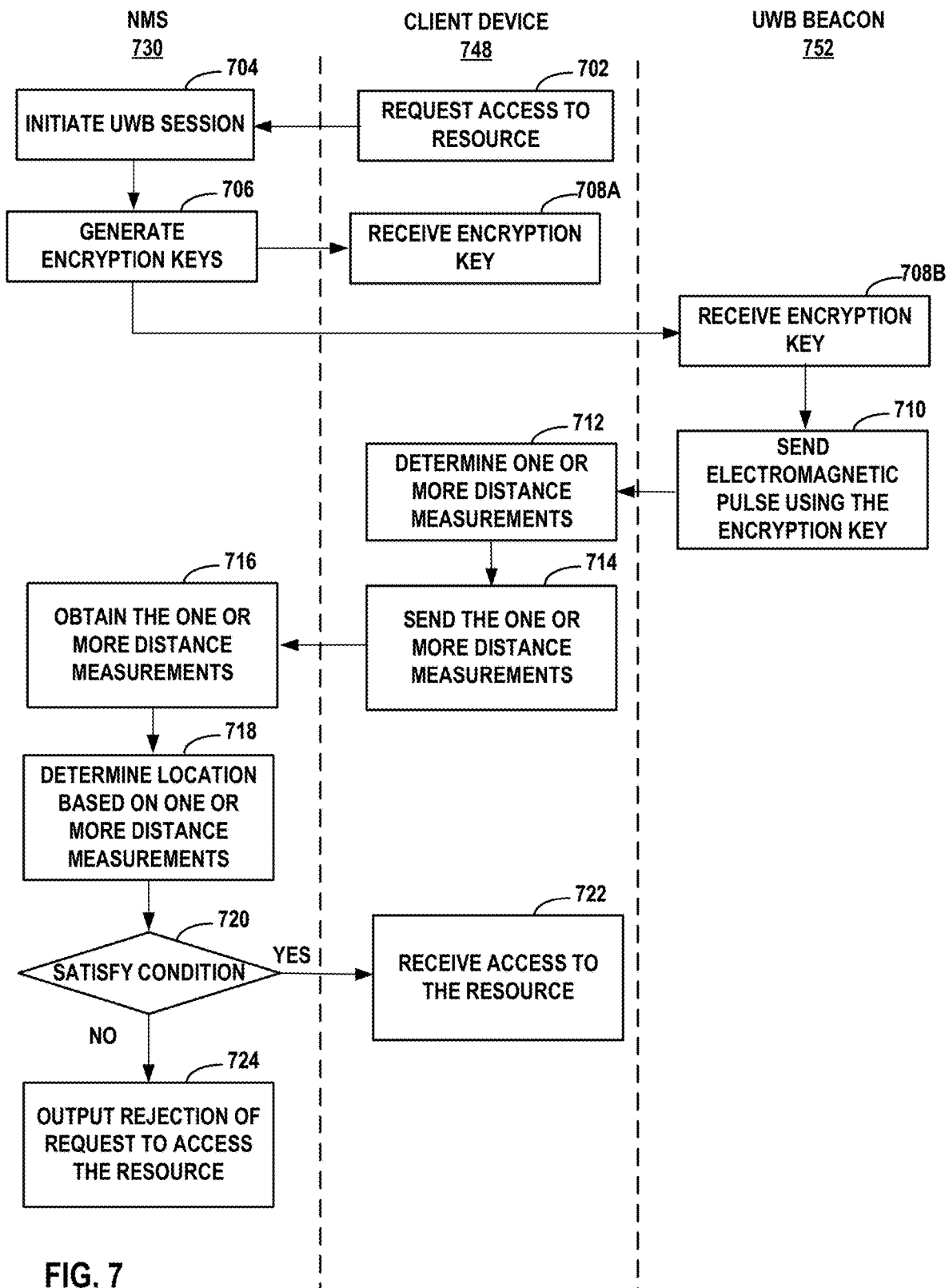
FIG. 7 is a flow chart illustrating an example operation of enforcing conditional access by a computing device to a resource based on a location of the computing device, in accordance with one or more techniques of this disclosure.

FIG. 7 is a flow chart illustrating an example operation of enforcing conditional access to a resource based on a location of client device 748, in accordance with one or more techniques of this disclosure. In the example of FIG. 7, NMS 730, client device 748, and UWB beacon 752 may correspond to NMS 130, client device 148, and UWB beacon 152 of FIG. 1C, for example. UWB beacon 752 may correspond to one or more of client devices 148, APs 142, switches 146, edge device 150, or other device of sites 102 of FIG. 1A. Client device 748 may request access to a resource (702). Client device 748 may request access to a resource such as a web site, electronic document, computing device, an SSID for a wireless local area network, or other type of high-level resource.

NMS 730 may initiate a UWB secure ranging session (704). NMS 730 may initiate a UWB secure ranging session between client device 748 and UWB beacon 752. NMS 730 may initiate a UWB secure ranging session by generating encryption keys (706). NMS 730 may generate encryption keys according to a UWB physical layer frame structure. NMS 730 may generate encryption keys that include STS in fields of the encryption key to ensure that the UWB secure ranging session is secure from faking or spoofing of devices involved in the UWB secure ranging session. NMS 730 may send the encryption keys to client device 748 and UWB beacon 752 via secure channel connections. Client device 748 may receive the encryption key via a secure channel connection (708A) and UWB beacon 752 may receive the encryption key via another secure channel connection (708B).

In response to receiving encryption keys associated with a UWB secure ranging session, either client device 748 or UWB beacon 752 may send an electromagnetic pulse to other devices in the UWB secure ranging session to determine distance measurements. In the example of FIG. 7, UWB beacon 752 may send an electromagnetic pulse using the encryption key generated by NMS 730 (710). Client device 748 may receive the electromagnetic pulse and determine one or more distance measurements (712). For example, client device 748 may implement a directional finding function to determine a Time of Flight of Angle of Arrival of the electromagnetic pulse. Client device 748 may send the one or more distance measurements to NMS 730 (714) using the software module executing on client device 748. In some examples, UWB beacon 752 may determine one or more distance measurements based on the UWB secure ranging session and send the one or more distance measurements to NMS 730.

NMS 730 may obtain the one or more distance measurements (716). NMS 730 may obtain the distance measurements either from client device 748 or UWB beacon 752. NMS 730 may determine a location of client device 748 based on the obtained distance measurements (718). For example, NMS 730 may determine a geographic location, spatial proximity, or position of client device 748 based on ToF and AoA measurements determined during the UWB secure ranging session. NMS 730 may, in some examples, apply a map of where UWB beacon 752 is located to determine the location of client device 748.

NMS 730 may use the determined location of client device 748 to determine whether a condition for accessing the requested resource has been satisfied (720). For example, NMS 730 may determine whether the location of client device 748 satisfies criteria associated with business rules or access policies established for regulating access to the requested resource. In some instances, NMS 730 may determine that the location of client device 748 satisfies the condition and grant access to client device 748 (YES branch of 720). Client device 748 may receive access to the resource (722). For example, client device 748 may receive a token with credentials for accessing the resource, such that client device 748 may act as a physical UWB token associated with access to the resource. In some instances, NMS 730 may determine that the location of client device 748 does not satisfy the condition (NO branch of 720). NMS 730 may output an indication of a rejection of the request to access the resource (724). NMS 730 may output the rejection of the request to access the resource to a software module of client device 748. In some examples, if client device 748 already has a token associated with access to the resource, NMS 730 may revoke the token, mark the token as expired, or otherwise secure the contents of the resource in response to NMS 730 determining the location of client device 748 no longer satisfies the location-based conditions to access the resource.

Figure 8:
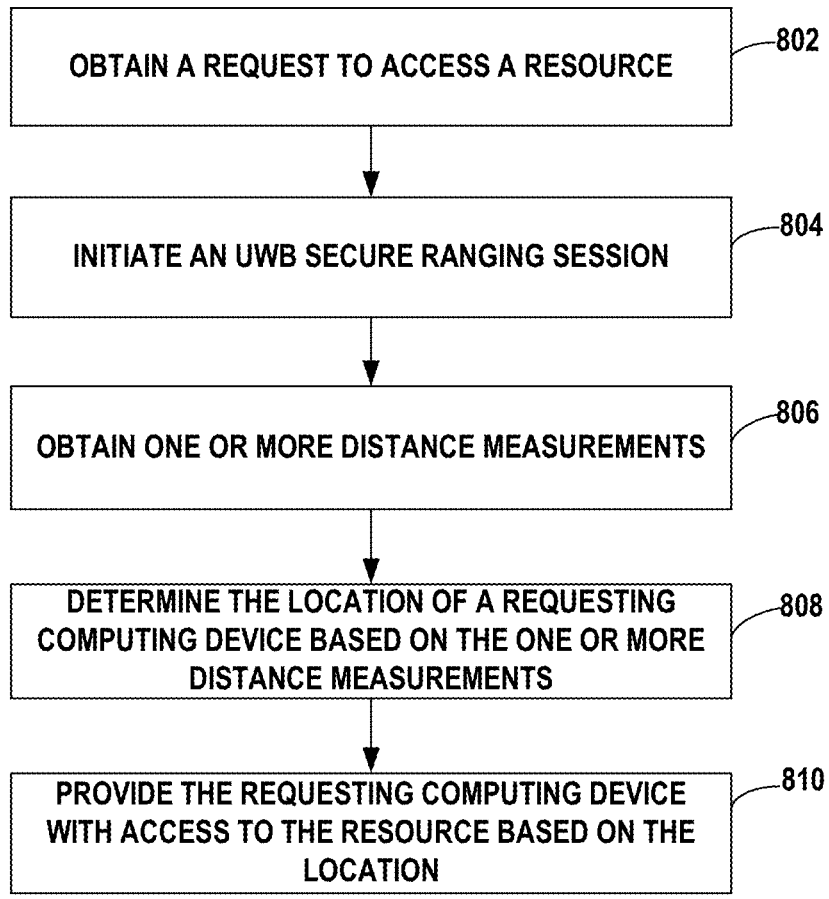
FIG. 8 is a flow chart illustrating an example operation for granting a computing device access to a resource based on a location of the computing device, in accordance with one or more techniques of this disclosure.

FIG. 8 is a flow chart illustrating an example operation for granting a computing device access to a resource based on a location of the computing device, in accordance with one or more techniques of this disclosure. FIG. 8 is discussed with FIGS. 1-6 for example purposes only.

NMS 130 may obtain a request to access a resource (802). NMS 130 may obtain the request from a first computing device supporting UWB protocol via a NAS device of a network site of network system 100, for example. NMS 130 may obtain the request from the first computing device on a wireless network at sites 102. NMS 130 may initiate an UWB secure ranging session (804). NMS 130 may initiate an UWB secure ranging session between the first computing device and a second computing device supporting the UWB protocol. NMS 130 may initiate the UWB secure ranging session to determine a location of the first computing device. NMS 130 may obtain one or more distance measurements based on the UWB secure ranging session (806). NMS 130 may obtain distance measurements such as ToF or AoA determined by electromagnetic pulses sent between the first computing device and the second computing device. NMS 130 may determine the location of the first computing device based on the one or more distance measurements (808). NMS 130 may determine the location of the first computing device based on the distance measurements and a map specifying the location of the second computing device. NMS 130 may provide the first computing device with access to the resource based on the location (810). NMS 130 may provide the first computing device access to the resource by issuing a token associated with valid credentials to access contents of the requested resource.

The following examples may illustrate one or more aspects of the disclosure.

Example 1: A network management system includes processing circuitry; and memory includes obtain, from a first computing device on a wireless network at a site, a request to access a resource, the first computing device supporting ultra-wide band (UWB) protocol; initiate an UWB secure ranging session between the first computing device and a second computing device to determine a location of the first computing device, wherein the second computing device is on the wireless network at the site and supporting the UWB protocol; obtain, based on the UWB secure ranging session, one or more distance measurements between the first computing device and the second computing device; determine the location of the first computing device based on the one or more distance measurements; and provide the first computing device with access to the resource based on the location of the first computing device satisfying a condition of an access policy for the resource.

Example 2: The network management system of example 1, wherein to initiate the UWB secure ranging session between the first device and the second device the instructions further cause the processing circuitry to: generate a plurality of encryption keys; send, via a first secure channel with the first computing device, a first encryption key of the plurality of encryption keys to the first computing device; and send, via a second secure channel with the second computing device, a second encryption key of the plurality of encryption keys to the second computing device.

Example 3: The network management system of example 2, wherein the first secure channel includes a network connection between the network management system and the first computing device, and wherein the second secure channel includes a network connection between the network management system and the second computing device.

Example 4: The network management system of any of examples 2 and 3, wherein the instructions further cause the processing circuitry to: generate at least one scrambled timestamp sequence associated with the UWB secure ranging session; and add the at least one scrambled timestamp sequence to a field of each of the plurality of encryption keys.

Example 5: The network management system of any of examples 1 through 4, wherein to provide the first computing device with access to the resource, the instructions further cause the processing circuitry to: monitor a change of location of the first computing device by continuously obtaining distance measurements associated with the first computing device relative to the second computing device during the UWB secure ranging session; determine the change of location of the first computing device relative to the determined location of the first computing device based on the continuously obtained distance measurements; and revoke access to the resource provided to the first computing device based on the change of location of the first computing device no longer satisfying the condition of the access policy for the resource.

Example 6: The network management system of any of examples 1 through 5, wherein the condition of the access policy for the resource includes a spatial zone relative to the second computing device.

Example 7: The network management system of any of examples 1 through 6, wherein the UWB secure ranging session is between the first computing device, the second computing device, and a third computing device, wherein the one or more distance measurements between the first computing device and the second computing device comprise a first set of distance measurements, and wherein the instructions further cause the processing circuitry to: obtain, based on the UWB secure ranging session, a second set of distance measurements between the third computing device and at least one of the first computing device or the second computing device; determine a location of the third computing device based on the second set of distance measurements; and determine a count of a number of devices within a spatial zone relative to the second computing device based on the location of the first computing device and the location of the third computing device, wherein to provide the first computing device with access to the resource, the instructions further cause the processing circuitry to provide the first computing device with access to the resource based on the location of the first computing device being within the spatial zone and the number of devices within the spatial zone satisfying the condition of the access policy for the resource, wherein the condition of the access policy includes a quorum of required devices being within the spatial zone relative to the second computing device.

Example 8: The network management system of any of examples 1 through 7, wherein the UWB secure ranging session is between the first computing device, the second computing device, and a third computing device, wherein the one or more distance measurements between the first computing device and the second computing device comprise a first set of distance measurements, and wherein the instructions further cause the processing circuitry to: obtain, based on the UWB secure ranging session, a second set of distance measurements between the third computing device and at least one of the first computing device or the second computing device; and determine a count of a number of devices in proximity to the first computing device based on the first set of distance measurements and the second set of distance measurements, wherein to provide the first computing device with access to the resource, the instructions further cause the processing circuitry to provide the first computing device with access to the resource based on the location of the first computing device and the number of devices in proximity to the first computing device satisfying the condition of the access policy for the resource, wherein the condition of the access policy includes a quorum of required devices being in proximity to the first computing device.

Example 9: The network management system of any of examples 1 through 8, wherein each distance measurement of the one or more distance measurements includes at least one of: a physical time-of-flight measurement between the first computing device and the second computing device or an angle of arrival measurement between the first computing device and the second computing device.

Example 10: The network management system of any of examples 1 through 9, wherein the first computing device is a client device that executes a network management system client module, and wherein the second computing device is an access point (AP) or a network access server (NAS) device.

Example 11: The network management system of any of examples 1 through 10, wherein the first computing device and the second computing device are client devices each executing a respective network management system client module.

Example 12: A method includes obtaining, from a first computing device on a wireless network at a site, a request to access a resource, the first computing device supporting ultra-wide band (UWB) protocol; initiating an UWB secure ranging session between the first computing device and a second computing device to determine a location of the first computing device, the second computing device on the wireless network at the site and supporting the UWB protocol; obtaining, based on the UWB secure ranging session, one or more distance measurements between the first computing device and the second computing device; determining the location of the first computing device based on the one or more distance measurements; and providing the first computing device with access to the resource based on the location of the first computing device satisfying a condition of an access policy for the resource.

Example 13: The method of example 12, wherein initiating the UWB secure ranging session between the first computing device and the second computing device comprises: generating a plurality of encryption keys; sending, via a first secure channel with the first computing device, a first encryption key of the plurality of encryption keys to the first computing device; and sending, via a second secure channel with the second computing device, a second encryption key of the plurality of encryption keys to the second computing device.

Example 14: The method of example 13, wherein the first secure channel includes a network connection between the network management system and the first computing device, and wherein the second secure channel includes a network connection between the network management system and the second computing device.

Example 15: The method of any of examples 13 and 14, further includes generating at least one scrambled timestamp sequence associated with the UWB secure ranging session; and adding the at least one scrambled timestamp sequence to a field of each of the plurality of encryption keys.

Example 16: The method of any of examples 12 through 15, wherein providing the first computing device with access to the resource further comprises: monitoring a change of location of the first computing device by continuously obtaining distance measurements associated with the first computing device by continuously obtaining distance measurements associated with the first computing device relative to the second computing device during the UWB secure ranging session; determining the change of location of the first computing device relative to the determined location of the first computing device based on the continuously obtained distance measurements; and revoking access to the resource provided to the first computing device based on the change of location of the first computing device no longer satisfying the condition of the access policy for the resource.

Example 17: The method of any of examples 12 through 16, wherein the condition of the access policy for the resource includes a spatial zone relative to the second computing device.

Example 18: The method of any of examples 12 through 17, wherein the UWB secure ranging session is between the first computing device, the second computing device, and a third computing device, wherein the one or more distance measurements between the first computing device and the second computing device comprise a first set of distance measurements, and wherein the method further comprises: obtaining, based on the UWB secure ranging session, a second set of distance measurements between the third computing device and at least one of the first computing device or the second computing device; determining a location of the third computing device based on the second set of distance measurements; and determining a count of a number of devices within a spatial zone relative to the second computing device based on the location of the first computing device and the location of the third computing device, wherein providing the first computing device with access to the resource comprises providing the first computing device with access to the resource based on the location of the first computing device being within the spatial zone and the number of devices within the spatial zone satisfying the condition of the access policy for the resource, wherein the condition of the access policy includes a quorum of required devices being within the spatial zone relative to the second computing device.

Example 19: The method of any of examples 12 through 18, wherein the UWB secure ranging session is between the first computing device, the second computing device, and a third computing device, wherein the one or more distance measurements between the first computing device and the second computing device comprise a first set of distance measurements, and wherein the method further comprises: obtaining, based on the UWB secure ranging session, a second set of distance measurements between the third computing device and at least one of the first computing device or the second computing device; and determining a count of a number of devices in proximity to the first computing device based on the first set of distance measurements and the second set of distance measurements, wherein providing the first computing device with access to the resource comprises providing the first computing device with access to the resource based on the location of the first computing device and the number of devices in proximity to the first computing device satisfying the condition of the access policy for the resource, wherein the condition of the access policy includes a quorum of required devices being in proximity to the first computing device.

Example 20: The method of any of examples 12 through 19, wherein each distance measurement of the one or more distance measurements includes at least one of: a physical time-of-flight measurement between the first computing device and the second computing device or an angle of arrival measurement between the first computing device and the second computing device.

Example 21: The method of any of examples 12 through 20, wherein the first computing device is a client device that executes a network management system client module, and wherein the second computing device is an access point (AP) or a network access server (NAS) device.

Example 22: The method of any of examples 12 through 21, wherein the first computing device and the second computing device are client devices each executing a respective network management system client module.

Example 23: Computer-readable storage media includes obtain, from a first computing device on a wireless network at a site, a request to access a resource, the first computing device supporting ultra-wide band (UWB) protocol; initiate an UWB secure ranging session between the first computing device and a second computing device to determine a location of the first computing device, the second computing device on the wireless network at the site and supporting the UWB protocol; obtain, based on the UWB secure ranging session, one or more distance measurements between the first computing device and the second computing device; determine the location of the first computing device based on the one or more distance measurements; and provide the first computing device with access to the resource based on the location of the first computing device satisfying a condition of an access policy for the resource.

Example 24: The computer-readable storage media of example 23, wherein to initiate the UWB secure ranging session between the first device and the second device, the instructions cause the processing circuitry to: generate a plurality of encryption keys; send, via a first secure channel with the first computing device, a first encryption key of the plurality of encryption keys to the first computing device; and send, via a second secure channel with the second computing device, a second encryption key of the plurality of encryption keys to the second computing device.

Example 25: The computer-readable storage media of example 24, wherein the first secure channel includes a network connection between the network management system and the first computing device, and wherein the second secure channel includes a network connection between the network management system and the second computing device.

Example 26: The computer-readable storage media of any of examples 24 and 25, wherein the instructions further cause the processing circuitry to: generate at least one scrambled timestamp sequence associated with the UWB secure ranging session; and add the at least one scrambled timestamp sequence to a field of each of the plurality of encryption keys.

Example 27: The computer-readable storage media of any of examples 23 through 26, wherein to provide the first computing device with access to the resource, the instructions further cause the processing circuitry to: monitor a change of location of the first computing device by continuously obtaining distance measurements associated with the first computing device relative to the second computing device during the UWB secure ranging session; determine the change of location of the first computing device relative to the determined location of the first computing device based on the continuously obtained distance measurements; and revoke access to the resource provided to the first computing device based on the change of location of the first computing device no longer satisfying the condition of the access policy for the resource.

Example 28: The computer-readable storage media of any of examples 23 through 27, wherein the condition of the access policy for the resource includes a spatial zone relative to the second computing device.

Example 29: The computer-readable storage media of any of examples 23 through 28, wherein the UWB secure ranging session is between the first computing device, the second computing device, and a third computing device, wherein the one or more distance measurements between the first computing device and the second computing device comprise a first set of distance measurements, and wherein the instructions further cause the processing circuitry to: obtain, based on the UWB secure ranging session, a second set of distance measurements between the third computing device and at least one of the first computing device or the second computing device; determine a location of the third computing device based on the second set of distance measurements; and determine a count of a number of devices within a spatial zone relative to the second computing device based on the location of the first computing device and the location of the third computing device, wherein to provide the first computing device with access to the resource, the instructions further cause the processing circuitry to provide the first computing device with access to the resource based on the location of the first computing device being within the spatial zone and the number of devices within the spatial zone satisfying the condition of the access policy for the resource, wherein the condition of the access policy includes a quorum of required devices being within the spatial zone relative to the second computing device.

Example 30: The computer-readable storage media of any of examples 23 through 29, wherein the UWB secure ranging session is between the first computing device, the second computing device, and a third computing device, wherein the one or more distance measurements between the first computing device and the second computing device comprise a first set of distance measurements, and wherein the instructions cause the processing circuitry to: obtain, based on the UWB secure ranging session, a second set of distance measurements between the third computing device and at least one of the first computing device or the second computing device; and determine a count of a number of devices in proximity to the first computing device based on the first set of distance measurements and the second set of distance measurements, wherein to provide the first computing device with access to the resource, the instructions further cause the processing circuitry to provide the first computing device with access to the resource based on the location of the first computing device and the number of devices in proximity to the first computing device satisfying the condition of the access policy for the resource, wherein the condition of the access policy includes a quorum of required devices being in proximity to the first computing device.

Example 31: The computer-readable storage media of any of examples 23 through 30, wherein each distance measurement of the one or more distance measurements includes at least one of: a physical time-of-flight measurement between the first computing device and the second computing device or an angle of arrival measurement between the first computing device and the second computing device.

Example 32: The computer-readable storage media of any of examples 23 through 31, wherein the first computing device is a client device that executes a network management system client module, and wherein the second computing device is an access point (AP) or a network access server (NAS) device.

Example 33: The computer-readable storage media of any of examples 23 through 32, wherein the first computing device and the second computing device are client devices each executing a respective network management system client module.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A network management system comprising:
   processing circuitry; and
   memory comprising instructions that when executed by the processing circuitry, cause the processing circuitry to:
   obtain, from a client device on a wireless network at a site, a request to access a cloud-based resource, the client device supporting ultra-wide band (UWB) protocol;
   initiate an UWB secure ranging session between the client device and a network device to determine a location of the client device, wherein the network device is on the wireless network at the site and supporting the UWB protocol;
   obtain, based on the UWB secure ranging session, one or more distance measurements between the client device and the network device;
   determine the location of the client device based on the one or more distance measurements;
   provide the client device with access to the cloud-based resource based on the location of the client device satisfying a condition of an access policy for the cloud-based resource; and
   revoke access to the cloud-based resource provided to the client device based on a change of location of the client device no longer satisfying the condition of the access policy for the cloud-based resource.

2. The network management system of claim 1, wherein to initiate the UWB secure ranging session between the client device and the network device the instructions further cause the processing circuitry to:
   generate a plurality of encryption keys;
   send, via a first secure channel with the client device, a first encryption key of the plurality of encryption keys to the client device; and
   send, via a second secure channel with the network device, a second encryption key of the plurality of encryption keys to the network device.

3. The network management system of claim 2, wherein the first secure channel includes a network connection between the network management system and the client device, and wherein the second secure channel includes a network connection between the network management system and the network device.

4. The network management system of claim 2, wherein the instructions further cause the processing circuitry to:
   generate at least one scrambled timestamp sequence associated with the UWB secure ranging session; and
   add the at least one scrambled timestamp sequence to a field of each of the plurality of encryption keys.

5. The network management system of claim 1, wherein to provide the client device with access to the cloud-based resource, the instructions further cause the processing circuitry to:
   monitor the change of location of the client device by continuously obtaining distance measurements associated with the client device relative to the network device during the UWB secure ranging session; and
   determine the change of location of the client device relative to the determined location of the client device based on the continuously obtained distance measurements.

6. The network management system of claim 1, wherein the condition of the access policy for the cloud-based resource includes a spatial zone defined by relative proximities of each of a plurality of network devices on the wireless network at the site, the plurality of network devices including the network device.

7. The network management system of claim 1, wherein the client device is a first client device, wherein the UWB secure ranging session is between the first client device, the network device, and a second client device, wherein the one or more distance measurements between the first client device and the network device comprise a first set of distance measurements, and wherein the instructions further cause the processing circuitry to:

obtain, based on the UWB secure ranging session, a second set of distance measurements between the second client device and at least one of the first client device or the network device;

determine a location of the third computing second client device based on the second set of distance measurements; and determine a count of a number of devices within a spatial zone relative to the network device based on the location of the first client device and the location of the second client device, wherein to provide the first client device with access to the cloud-based resource, the instructions further cause the processing circuitry to provide the first client device with access to the cloud-based resource based on the location of the first client device being within the spatial zone and the number of devices within the spatial zone satisfying the condition of the access policy for the cloud-based resource, wherein the condition of the access policy includes a quorum of required devices being within the spatial zone relative to the network device.

8. The network management system of claim 1, wherein the client device is a first client device, wherein the UWB secure ranging session is between the first client device, the network device, and a second client device, wherein the one or more distance measurements between the first client device and the network device comprise a first set of distance measurements, and wherein the instructions further cause the processing circuitry to:

obtain, based on the UWB secure ranging session, a second set of distance measurements between the second client device and at least one of the first client device or the network device; and determine a count of a number of devices in proximity to the first client device based on the first set of distance measurements and the second set of distance measurements, wherein to provide the first client device with access to the cloud-based resource, the instructions further cause the processing circuitry to provide the first client device with access to the cloud-based resource based on the location of the first client device and the number of devices in proximity to the first client device satisfying the condition of the access policy for the cloud-based resource, wherein the condition of the access policy includes a quorum of required devices being in proximity to the first client device.

9. The network management system of claim 1, wherein each distance measurement of the one or more distance measurements includes at least one of: a physical time-of-flight measurement between the client device and the network device or an angle of arrival measurement between the client device and the network device.

10. The network management system of claim 1, wherein the client device executes a network management system client module, and wherein the network device is an access point (AP) or a network access server (NAS) device.

11. The network management system of claim 1, wherein the client device and the network device are each executing a respective network management system client module.

12. A method comprising:

obtaining, from a client device on a wireless network at a site, a request to access a cloud- based resource, the client device supporting ultra-wide band (UWB) protocol;

initiating an UWB secure ranging session between the client device and a network device to determine a location of the client device, the network device on the wireless network at the site and supporting the UWB protocol;

obtaining, based on the UWB secure ranging session, one or more distance measurements between the client device and the network device;

determining the location of the client device based on the one or more distance measurements;

providing the client device with access to the cloud-based resource based on the location of the client device satisfying a condition of an access policy for the cloud-based resource; and revoking access to the cloud-based resource provided to the client device based on a change of location of the client device no longer satisfying the condition of the access policy for the cloud-based resource.

13. The method of claim 12, wherein initiating the UWB secure ranging session between the client device and the network device comprises:

generating a plurality of encryption keys;

sending, via a first secure channel with the client device, a first encryption key of the plurality of encryption keys to the client device; and sending, via a second secure channel with the network device, a second encryption key of the plurality of encryption keys to the network device.

14. The method of claim 12, wherein providing the client device with access to the cloud-based resource further comprises:

monitoring the change of location of the client device by continuously obtaining distance measurements associated with the client device by continuously obtaining distance measurements associated with the client device relative to the network device during the UWB secure ranging session; and determining the change of location of the client device relative to the determined location of the client device based on the continuously obtained distance measurements.

15. The method of claim 12, wherein the condition of the access policy for the cloud-based resource includes a spatial zone defined by relative proximities of each of a plurality of network devices on the wireless network at the site, the plurality of network devices including the network device.

16. The method of claim 12, wherein the client device is a first client device, wherein the UWB secure ranging session is between the first client device, the network device, and a second client device, wherein the one or more distance measurements between the first client device and the network device comprise a first set of distance measurements, and wherein the method further comprises:

obtaining, based on the UWB secure ranging session, a second set of distance measurements between the second client device and at least one of the first client device or the network device;

determining a location of the second client device based on the second set of distance measurements; and determining a count of a number of devices within a spatial zone relative to the network device based on the location of the first client device and the location of the second client device, wherein providing the first client device with access to the cloud-based resource comprises providing the first client device with access to the cloud-based resource based on the location of the first client device being within the spatial zone and the number of devices within the spatial zone satisfying the condition of the access policy for the cloud-based resource, wherein the condition of the access policy includes a quorum of required devices being within the spatial zone relative to the network device.

17. The method of claim 12, wherein each distance measurement of the one or more distance measurements includes at least one of: a physical time-of-flight measurement between the client device and the network device or an angle of arrival measurement between the client device and the network device.

18. Computer-readable storage media comprising machine readable instructions that, when executed, cause processing circuitry to:
   obtain, from a client device on a wireless network at a site, a request to access a cloud-based resource, the client device supporting ultra-wide band (UWB) protocol;
   initiate an UWB secure ranging session between the client device and a network device to determine a location of the client device, the network device on the wireless network at the site and supporting the UWB protocol;
   obtain, based on the UWB secure ranging session, one or more distance measurements between the client device and the network device;
   determine the location of the client device based on the one or more distance measurements;
   provide the client device with access to the cloud-based resource based on the location of the client device satisfying a condition of an access policy for the cloud-based resource; and
   revoke access to the cloud-based resource provided to the client device based on a change of location of the client device no longer satisfying the condition of the access policy for the cloud-based resource.

19. The computer-readable storage media of claim 18, wherein to initiate the UWB secure ranging session between the client device and the network device, the instructions cause the processing circuitry to:
   generate a plurality of encryption keys;
   send, via a first secure channel with the client device, a first encryption key of the plurality of encryption keys to the client device; and
   send, via a second secure channel with the network device, a second encryption key of the plurality of encryption keys to the network device.

20. The computer-readable storage media of claim 18, wherein the client device is a first client device, wherein the UWB secure ranging session is between the first client device, network device, and a second client device, wherein the one or more distance measurements between the first client device and the network device comprise a first set of distance measurements, and wherein the instructions cause the processing circuitry to:
   obtain, based on the UWB secure ranging session, a second set of distance measurements between the second client device and at least one of the first client device or the network device; and
   determine a count of a number of devices in proximity to the first client device based on the first set of distance measurements and the second set of distance measurements,
   wherein to provide the first client device with access to the cloud-based resource, the instructions further cause the processing circuitry to provide the first client device with access to the cloud-based resource based on the location of the first client device and the number of devices in proximity to the first client device satisfying the condition of the access policy for the cloud-based resource, wherein the condition of the access policy includes a quorum of required devices being in proximity to the first client device.

* * * * *